US012472050B2

(12) United States Patent
Lam et al.

(10) Patent No.: US 12,472,050 B2
(45) Date of Patent: Nov. 18, 2025

(54) DOCK HOLDER, PACKAGING, AND METHODS OF USE

(71) Applicant: EDWARDS LIFESCIENCES CORPORATION, Irvine, CA (US)

(72) Inventors: Jason Seng-Che Lam, Lake Forest, CA (US); Darshin S. Patel, San Juan Capistrano, CA (US); Alyssa Joy Hamm, Huntington Beach, CA (US); Yuanlong Du, Irvine, CA (US); Jocelyn Chau, Buena Park, CA (US); Sean Chow, Irvine, CA (US); Vipul P. Rajpara, Lake Forest, CA (US)

(73) Assignee: EDWARDS LIFESCIENCES CORPORATION, Irvine, CA (US)

( * ) Notice: Subject to any disclaimer, the term of this patent is extended or adjusted under 35 U.S.C. 154(b) by 47 days.

(21) Appl. No.: 18/332,159

(22) Filed: Jun. 9, 2023

(65) Prior Publication Data
US 2023/0329851 A1 Oct. 19, 2023

Related U.S. Application Data

(63) Continuation of application No. PCT/US2021/062340, filed on Dec. 8, 2021.

(60) Provisional application No. 63/123,425, filed on Dec. 9, 2020.

(51) Int. Cl.
*A61B 17/06* (2006.01)
*A61F 2/00* (2006.01)
*A61F 2/24* (2006.01)
*B65D 1/36* (2006.01)
(Continued)

(52) U.S. Cl.
CPC .......... *A61F 2/0095* (2013.01); *A61F 2/2409* (2013.01); *B65D 1/36* (2013.01); *B65D 25/10* (2013.01); *B65D 43/16* (2013.01)

(58) Field of Classification Search
CPC .......... B65D 1/36; B65D 25/10; B65D 43/16; A61F 2/0095; A61F 2/2409; A61F 2220/0091; A61F 2220/0033; A61F 2/2427; A61F 2/2466; A61B 50/20; A61B 50/30;
(Continued)

(56) References Cited

U.S. PATENT DOCUMENTS

| 4,011,947 A | 3/1977 | Sawyer |
| 4,101,031 A | 7/1978 | Cromie |
| 4,182,446 A | 1/1980 | Penny |

(Continued)

FOREIGN PATENT DOCUMENTS

| JP | 2016120307 A | 7/2016 |
| WO | WO-2008035337 A2 | 3/2008 |

*Primary Examiner* — Luan K Bui
(74) *Attorney, Agent, or Firm* — Klarquist Sparkman LLP

(57) ABSTRACT

A container configured to receive a dock assembly therein for packaging is disclosed. The container can include: a base defining an engagement surface configured to receive the dock assembly; a lid configured to releasably engage with the base such that at least a portion of the dock assembly is disposed between the base and the lid; and a dock holder affixed to the container and configured to receive a first portion of the dock assembly comprising two or more adjacent coils thereon. The dock holder can comprise a protrusion configured to engage the first portion of the dock assembly and space a second portion of the dock assembly away from the dock holder.

19 Claims, 35 Drawing Sheets

(51) Int. Cl.
*B65D 25/10* (2006.01)
*B65D 43/16* (2006.01)

(58) Field of Classification Search
CPC ...... A61B 2050/006; A61B 2050/3005; A61B 2050/3008; A61M 25/002
USPC ........................................ 206/363, 370, 438
See application file for complete search history.

(56) References Cited

U.S. PATENT DOCUMENTS

| | | |
|---|---|---|
| 4,211,325 A | 7/1980 | Wright |
| 4,697,703 A | 10/1987 | Will |
| 4,801,015 A | 1/1989 | Lubock et al. |
| 5,167,223 A | 12/1992 | Koros et al. |
| 5,236,450 A | 8/1993 | Scott |
| 5,294,413 A * | 3/1994 | Riihimaki ................. A61L 2/06 |
| | | 206/370 |
| 5,336,616 A | 8/1994 | Livesey et al. |
| 5,480,425 A | 1/1996 | Ogilive |
| 5,531,785 A | 7/1996 | Love et al. |
| 5,560,487 A | 10/1996 | Starr |
| 5,578,076 A | 11/1996 | Krueger et al. |
| 5,582,607 A | 12/1996 | Lackman |
| 5,615,770 A | 4/1997 | Applebaum et al. |
| 5,690,226 A | 11/1997 | N'Guyen |
| 5,720,391 A | 2/1998 | Dohm et al. |
| 5,776,187 A | 7/1998 | Krueger et al. |
| 5,800,531 A | 9/1998 | Cosgrove et al. |
| 5,823,342 A | 10/1998 | Caudillo et al. |
| 5,868,253 A | 2/1999 | Krueger et al. |
| 5,980,569 A | 11/1999 | Scirica |
| 5,984,959 A | 11/1999 | Robertson et al. |
| 6,090,138 A | 7/2000 | Chasak et al. |
| 6,099,812 A * | 8/2000 | Allen ........................ A61L 2/26 |
| | | 206/370 |
| 6,126,007 A | 10/2000 | Kari et al. |
| 6,199,696 B1 | 3/2001 | Lytle et al. |
| 6,346,094 B2 | 2/2002 | West et al. |
| 6,416,547 B1 | 7/2002 | Erickson et al. |
| 6,534,004 B2 | 3/2003 | Chen et al. |
| 6,591,998 B2 | 7/2003 | Haynes et al. |
| 6,723,122 B2 | 4/2004 | Yang et al. |
| 6,736,845 B2 | 5/2004 | Marquez et al. |
| 6,966,925 B2 | 11/2005 | Stobie |
| 7,389,874 B2 | 6/2008 | Quest et al. |
| 7,699,168 B2 | 4/2010 | Ryan et al. |
| 7,712,606 B2 | 5/2010 | Salahieh et al. |
| 7,722,837 B2 * | 5/2010 | Riley .................... A61B 50/33 |
| | | 206/370 |
| 7,866,468 B2 | 1/2011 | Kyritsis |
| 8,652,145 B2 | 2/2014 | Maimon et al. |
| 8,662,306 B2 * | 3/2014 | Agrawal ................ B65D 85/00 |
| | | 206/370 |
| 2002/0120328 A1 | 8/2002 | Pathak et al. |
| 2003/0070944 A1 | 4/2003 | Nigam |
| 2005/0241981 A1 | 11/2005 | Gupta et al. |
| 2006/0155363 A1 | 7/2006 | Laduca et al. |
| 2006/0195183 A1 | 8/2006 | Navia et al. |
| 2008/0082163 A1 | 4/2008 | Woo |
| 2008/0177381 A1 | 7/2008 | Navia et al. |
| 2009/0071851 A1 | 3/2009 | Maki et al. |
| 2009/0130162 A2 | 5/2009 | Pathak et al. |
| 2009/0164005 A1 | 6/2009 | Dove et al. |
| 2011/0147251 A1 | 6/2011 | Hodshon et al. |
| 2011/0307002 A1 | 12/2011 | Gilson et al. |
| 2013/0264239 A1 | 10/2013 | Agrawal |
| 2013/0325111 A1 | 12/2013 | Campbell et al. |
| 2017/0056149 A1* | 3/2017 | Rajpara ................ A61F 2/9525 |
| 2018/0177594 A1 | 6/2018 | Patel et al. |

* cited by examiner

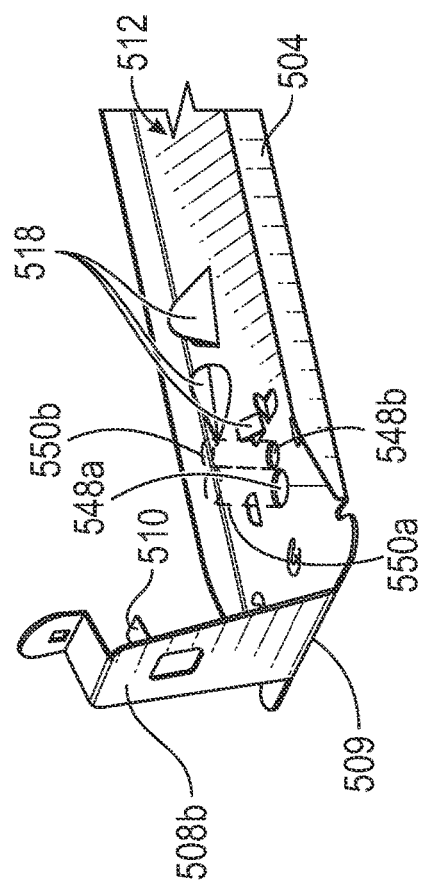
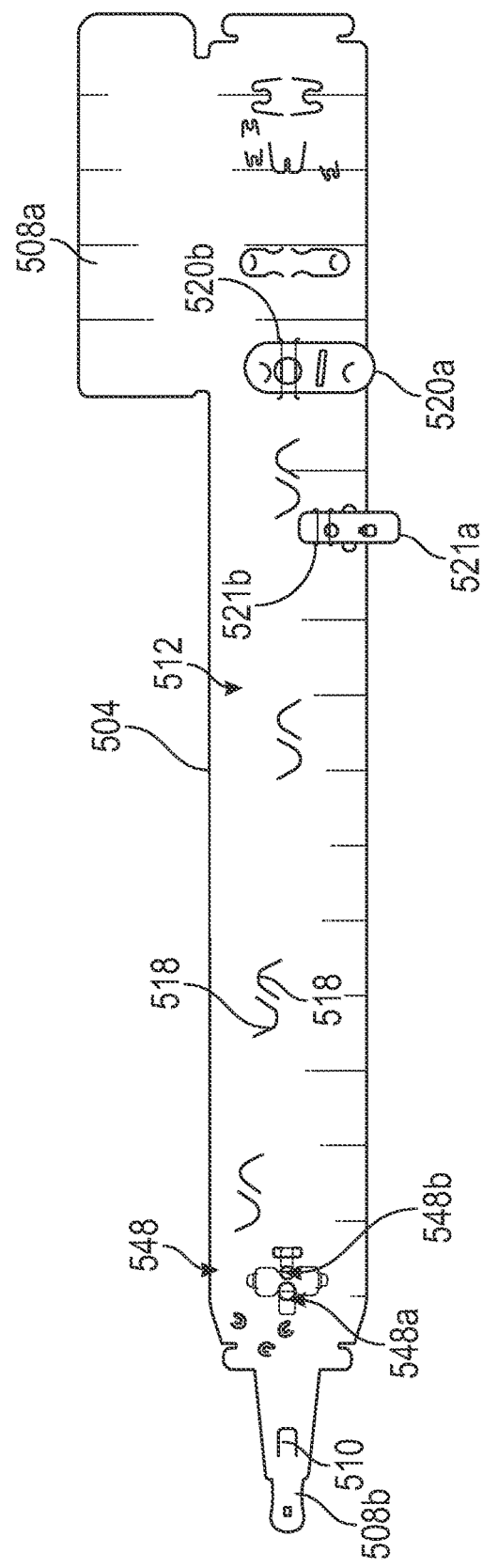

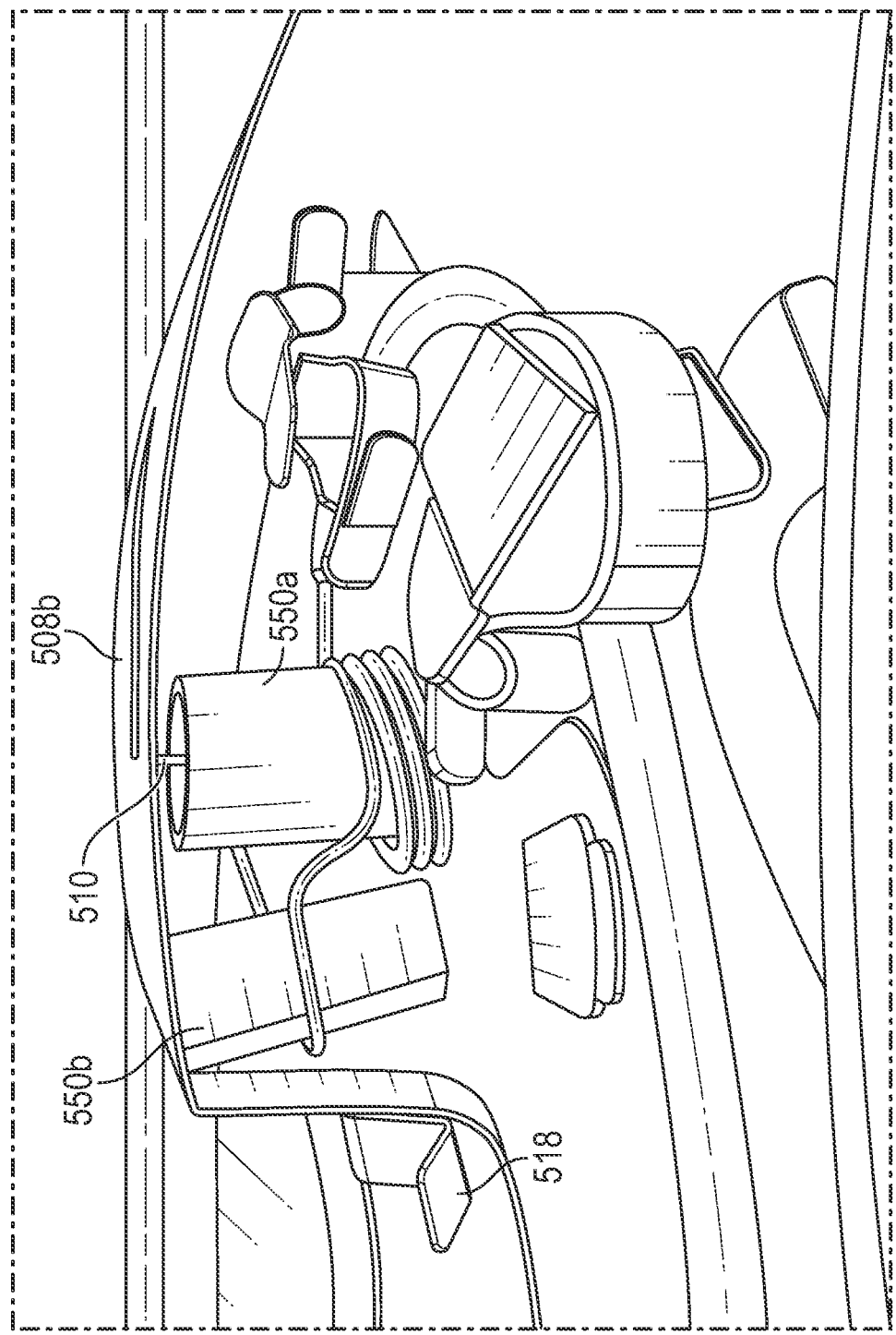

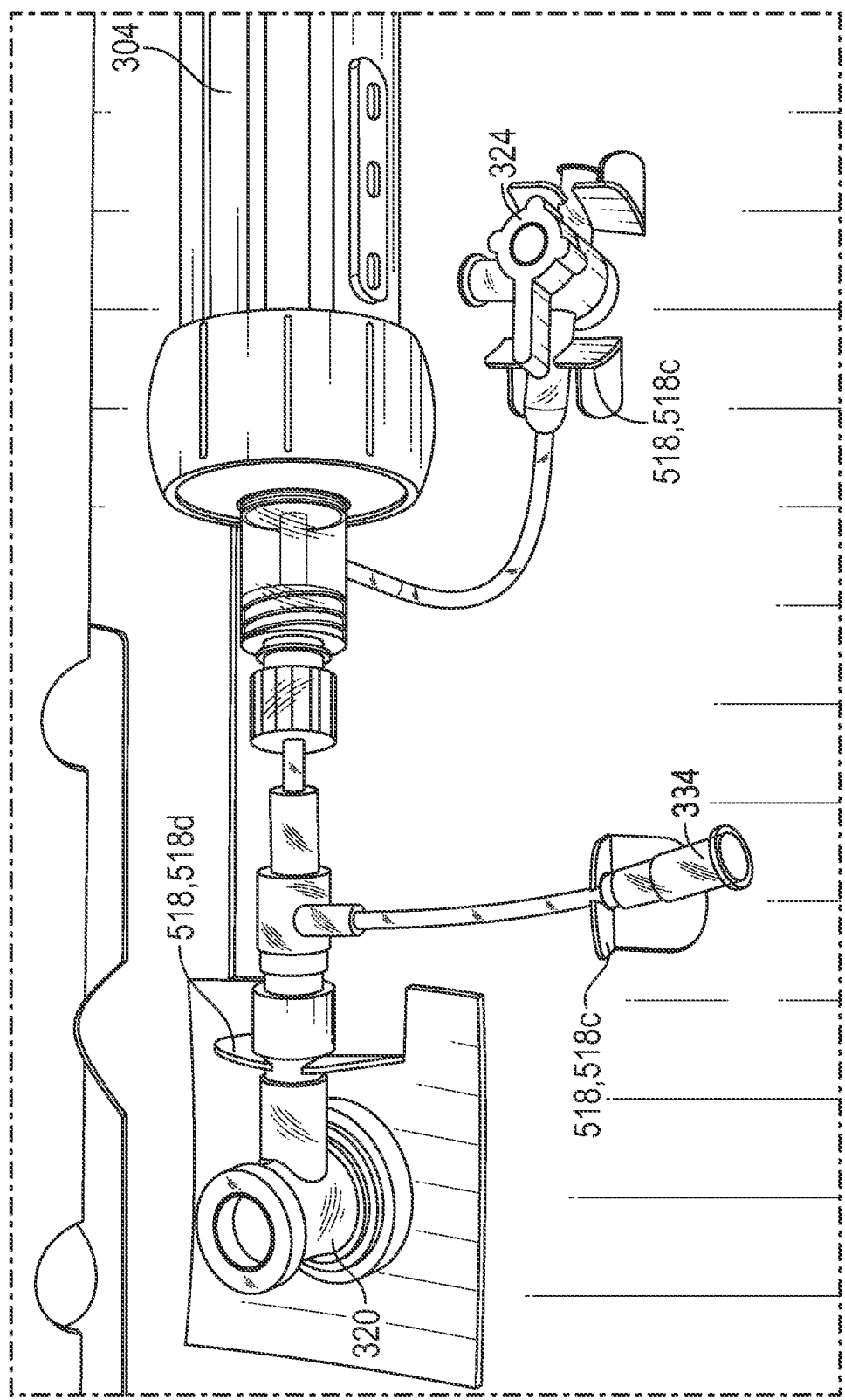

DOCK HOLDER, PACKAGING, AND METHODS OF USE

CROSS REFERENCE TO RELATED APPLICATION

This application is a continuation of PCT patent application no. PCT/US2021/062340, filed on Dec. 8, 2021, which application claims the benefit of U.S. Provisional Patent Application No. 63/123,425, filed Dec. 9, 2020, each of these applications being incorporated herein in its entirety by this specific reference.

FIELD

The present disclosure relates to systems and methods related to systems for treating valvular regurgitation and/or other valve issues.

BACKGROUND

Prosthetic heart valves can be used to treat cardiac valvular disorders. The native heart valves (the aortic, pulmonary, tricuspid and mitral valves) serve critical functions in assuring the forward flow of an adequate supply of blood through the cardiovascular system. These heart valves can be rendered less effective by congenital, inflammatory, infectious, and other conditions. Such conditions can eventually lead to serious cardiovascular compromise or death.

A transcatheter technique can be used for introducing and implanting a prosthetic heart valve using a flexible catheter in a manner that is less invasive than open heart surgery. In this technique, a prosthetic valve can be mounted in a crimped state on the end portion of a flexible catheter and advanced through a blood vessel of the patient until the valve reaches the implantation site. The valve at the distal end of the catheter can then be expanded to its functional size at the site of the defective native valve, such as by inflating a balloon on which the valve is mounted. Alternatively, the valve can have a resilient, self-expanding stent or frame that expands the valve to its functional size when it is advanced from a delivery sheath at the distal end of the catheter. Optionally, the valve can have a mechanically expandable frame, or the valve can have a combination of expansion mechanism, such as balloon expandable, self-expandable, and/or mechanically expandable portions.

Transcatheter heart valves (THVs) could theoretically be appropriately sized or shaped to be placed inside native mitral and tricuspid valves. However, mitral and tricuspid valve anatomy can vary significantly from person to person and it can be difficult to appropriately size and shape a valve for many patients. Further, when treating valve insufficiency, the surrounding tissue may not be strong enough to hold certain types of valves in position as desired. It would be beneficial to have a docking system and/or apparatus to secure prosthetic valves in the proper position and appropriate delivery systems to ensure safe and effective delivery. Additionally, the shape of the native valve may allow for paravalvular leakage around the prosthetic valve (i.e., blood flow bypassing the prosthetic valve). As such, solutions to increase efficiency of prosthetic valve placement and to reduce paravalvular leakage would be beneficial.

The docking system has to be prepared and packaged in a way to improve functionality of the docking system. Elements of the docking system and the delivery system should be properly secured and prepared prior to storage, shipment, or use by medical professionals.

SUMMARY

The foregoing needs are met by the various aspects of dock holders, packaging containers, and methods of use disclosed herein. According to an aspect of the disclosure, a container configured to receive a dock assembly therein for packaging includes a base defining an engagement surface configured to receive the dock assembly; a lid configured to releasably engage with the base such that at least a portion of the dock assembly is disposed between the base and the lid; and a dock holder affixed to the container and configured to receive a first portion of the dock assembly comprising two or more adjacent coils thereon. The dock holder comprises a protrusion configured to engage the first portion of the dock assembly and space a second portion of the dock assembly away from the dock holder.

According to another aspect of the disclosure, a dock holder configured to releasably secure a dock assembly to a container includes a body having a proximal end, a distal end opposite the proximal end, and an inner surface defining a central bore extending between the proximal and distal ends; and a helical thread extending around and radially outward from an exterior surface of the body, the helical thread configured to receive a first portion of the dock assembly thereon.

According to yet another aspect of the disclosure, an assembly comprises a container comprising a base including a first depression with a post extending outward from the depression; and a dock holder disposed within the first depression and mounted around the post. The dock holder is configured to receive a first portion of a dock assembly around an exterior surface of the dock holder and comprises a radial protrusion configured to separate adjacent coils of the first portion of the dock assembly from each other.

The various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosure will become more apparent from the following detailed description, claims, and accompanying figures.

BRIEF DESCRIPTION OF THE DRAWINGS

FIG. 23 illustrates a close-up portion of the indicated section of the packaging of FIG. 22.

FIG. 24 illustrates a top plan view of the packaging of FIG. 22 in a flat configuration according to an aspect of the disclosure.

FIG. 29G illustrates a perspective view of another portion of the packaging of FIG. 29A showing another plurality of retention members thereon.

FIG. 29I illustrates a perspective view of another portion of the packaging of FIG. 29A showing another plurality of retention members thereon.

Aspects of the disclosure will now be described in detail with reference to the drawings, wherein like reference numbers refer to like elements throughout, unless specified otherwise.

DETAILED DESCRIPTION

General Considerations

Figure 1:
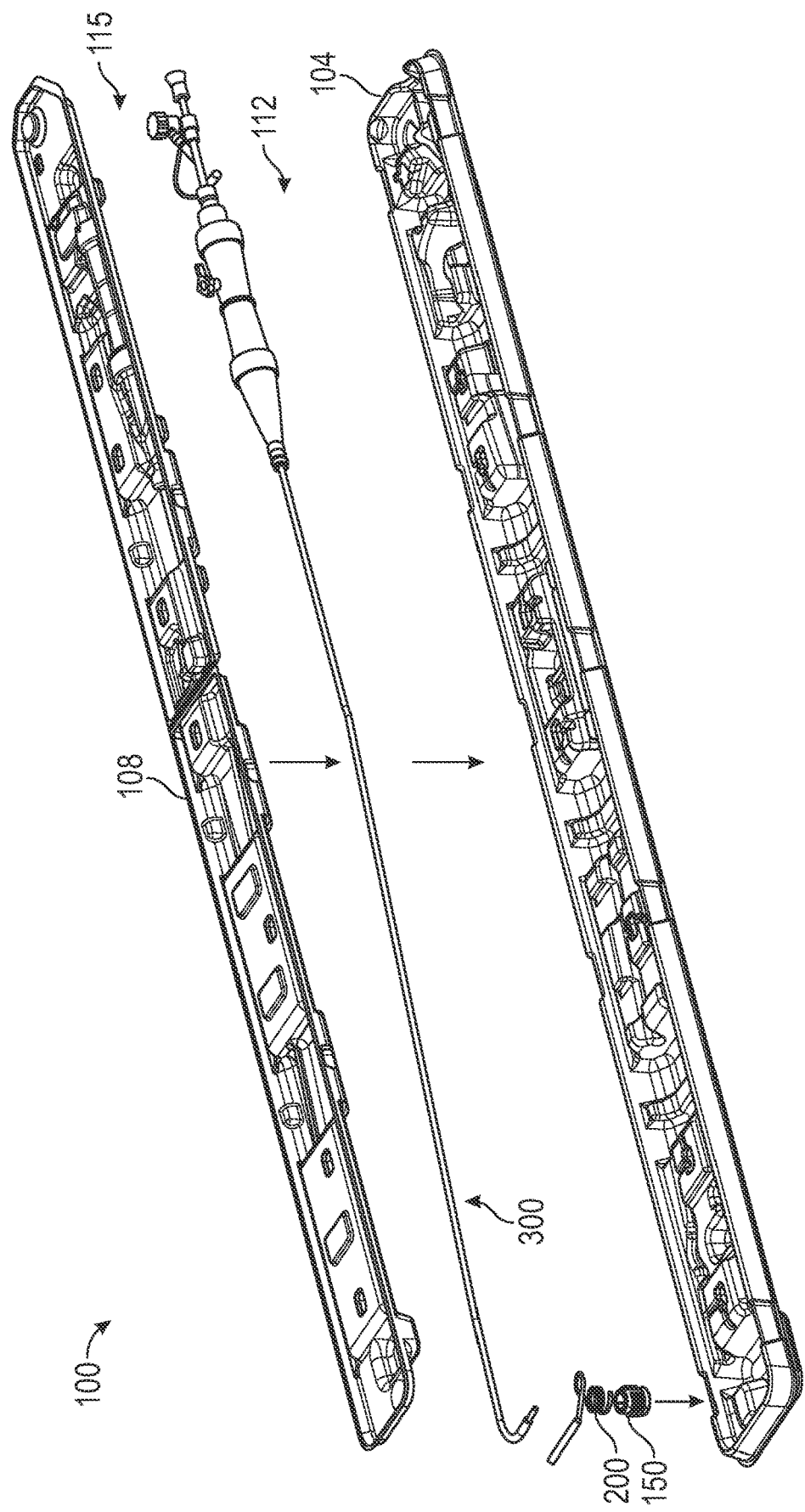
FIG. 1 illustrates a perspective view of a packaging according to an aspect of the disclosure and showing a dock delivery system (DDS) and a dock assembly therein.

For purposes of this description, certain aspects, advantages, and novel features of the examples of this disclosure are described herein. The described methods, systems, and apparatus should not be construed as limiting in any way. Instead, the present disclosure is directed toward all novel and non-obvious features and aspects of the various disclosed examples, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present, or problems be solved.

Although the operations of some of the disclosed examples are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the term "coupled" generally means physically, mechanically, chemically, magnetically, and/or electrically coupled or linked and does not exclude the presence of intermediate elements between the coupled or associated items absent specific contrary language.

As used herein, the term "proximal" refers to a position, direction, or portion of a device that is closer to the user and further away from the implantation site. As used herein, the term "distal" refers to a position, direction, or portion of a device that is further away from the user and closer to the implantation site. Thus, for example, proximal motion of a device is motion of the device away from the implantation site and toward the user (e.g., out of the patient's body), while distal motion of the device is motion of the device away from the user and toward the implantation site (e.g., into the patient's body). The terms "longitudinal" and "axial" refer to an axis extending in the proximal and distal directions, unless otherwise expressly defined.

Examples of the Disclosed Technology

Described herein are examples of dock assemblies configured to be deployed at a native valve of a heart with one or more portions of the dock assembly (e.g., a dock or docking device) implanted at the native valve. In some examples, the dock assemblies can be contained within a dock delivery system (e.g., a delivery apparatus) for navigation through a patient's vasculature toward the implantation site (e.g., the native valve) and deployed from the dock delivery system at or near the native valve.

Also described herein are various examples of a packaging comprising one or more pieces and configured to receive the dock assembly and at least a portion of the dock delivery system. In some examples, the packaging can be configured to receive or comprise a dock holder configured to receive at least a portion of the dock assembly thereon.

Various heart valve ailments can be alleviated via a docking assembly (or docking device or anchor) introduced into or adjacent the native heart valve. Exemplary docking devices (or "docks") and their capabilities are disclosed, for example, in PCT/2020/036577, which is incorporated herein for reference in its entirety.

Such docking assemblies (or devices) and/or delivery systems for such docking assemblies need to be prepared, packaged, stored, shipped, and conditioned accordingly to maintain sterility and biocompatibility. The docking assembly can be configured to undergo sterilization that is suitable to kill, or otherwise deactivate, any pathogens on or in the docking assembly. In some aspects, the docking assembly can be introduced into the patient via a dock delivery system (DDS), for example a DDS that is disclosed in the aforementioned PCT/2020/036577. The DDS may be packaged, stored, delivered, and prepared together with the docking assembly. As such, the DDS can also be configured to undergo suitable sterilization. Finally, to retain the docking assembly and the DDS in a desired configuration during storage and shipment, a suitable packaging may be provided that receives the docking assembly and the DDS therein. As such, the packaging can also be configured to undergo sufficient sterilization like the docking assembly and the DDS.

In some aspects, a packaging contains the docking assembly and the DDS therein, and the packaging, along with the docking assembly and the DDS, can be sterilized and sealed to prevent exposure to pathogens from an unsterile external environment. Furthermore, the packaging can serve a functional purpose of protecting the components therein and maintaining them in a desired arrangement. The components (e.g., the docking assembly and the DDS) can be retained in the desired orientation to prevent them from being damaged during shipment and storage. This can also serve to allow a user to better access these components when removing them from the packaging, so as to decrease chance of user error that can damage components due to improper removal from the packaging or pre-use conditioning.

Referring to FIGS. 1-6, an exemplary packaging 100 is described (the packaging can also be referred to herein as a container). The packaging 100 is configured to receive a dock assembly 200 therein. The packaging 100 may also be configured to receive a dock delivery system (DDS) 300. An exemplary DDS 300 is shown in greater detail in FIG. 17A, as described further below.

The packaging 100 may include a dock holder 150 (described below with reference to FIGS. 7-10) configured to receive the dock assembly 200 thereon. The dock assembly 200 may be operatively connected to the DDS 300, such that at least a portion of the dock assembly 200 is movable by the DDS 300. For example, the DDS 300 may be configured to cause the dock assembly 200 to move into or out of the DDS. In some aspects, the DDS 300 may be configured to cause one or more components of the dock assembly 200 (for example, a sleeve 220 and/or a dock 230) to move relative to another portion of the dock assembly 200.

Figure 2:
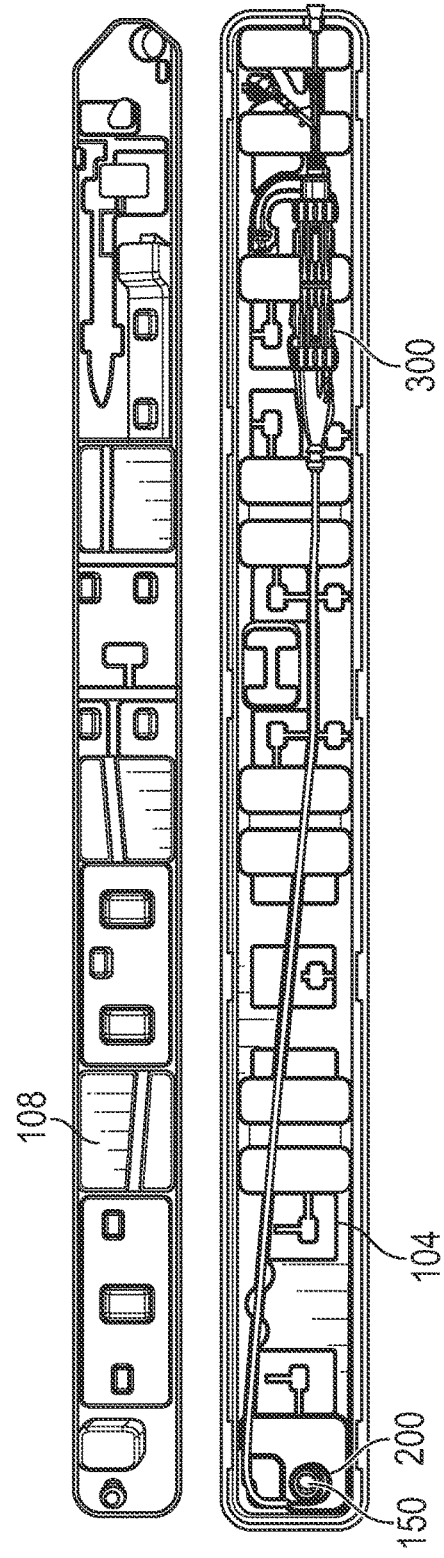
FIG. 2 illustrates a top perspective view of the packaging of FIG. 1 in an open configuration showing the base and the lid according to an aspect of the disclosure.

Referring to FIGS. 1 and 2, the packaging 100 may include a base 104 and a lid 108 configured to releasably engage with the base 104. An interior space 112 between the base 104 and the lid 108 is defined by the base 104 and the lid 108 (FIG. 1). The interior space 112 can be dimensioned to receive the dock assembly 200 and/or the DDS 300. In some examples, both the dock assembly 200 and the DDS 300 may be disposed within the interior space 112 between the base 104 and the lid 108 (FIG. 2).

The lid 108 may be configured to securely engage with the base 104 to secure the dock assembly 200 and/or the DDS 300 within the interior space 112. In some aspects, the lid 108 may be separate from the base 104, such that the base 104 and the lid 108 are distinct pieces. The lid 108 may be configured to be secured to the base 104 via snap fit, friction fit, adhesive, fasteners, or via another suitable mechanism. In some examples, the lid 108 and the base 104 define a hinged connection therebetween, such that the packaging 100 is a clamshell, where the lid 108 is configured to be attached to the base 104 and configured to hingedly move toward and away from the base 104.

The packaging 100 includes an open configuration and a closed configuration. In the open configuration (FIGS. 1 and 2), the lid 108 is spaced away from the base 104, such that the interior space 112 is accessible from an exterior of the packaging 100 via an opening 115 between the base 104 and the lid 108 (FIG. 1). When the packaging 100 is in the open configuration, the dock assembly 200 and/or the DDS 300 may be introduced into the interior space 112. Thus, the interior space 112 should be sufficiently large to allow the dock assembly 200 and/or the DDS 300 to be placed therein. In the closed configuration of the packaging 100, the lid 108 is in contact with, and is affixed to, the base 104.

Figure 3:
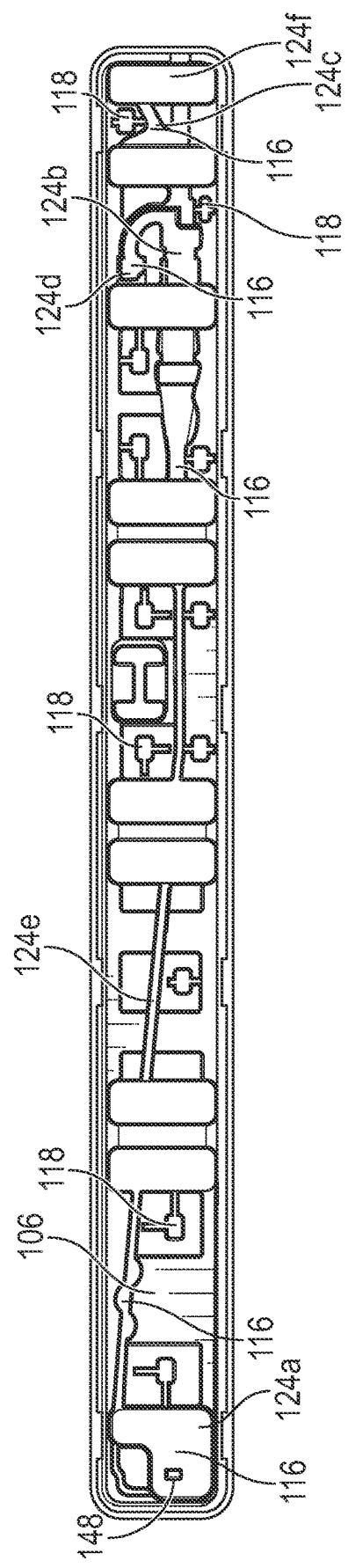
FIG. 3 illustrates a base of the packaging according to an aspect of the disclosure.
Figure 4:
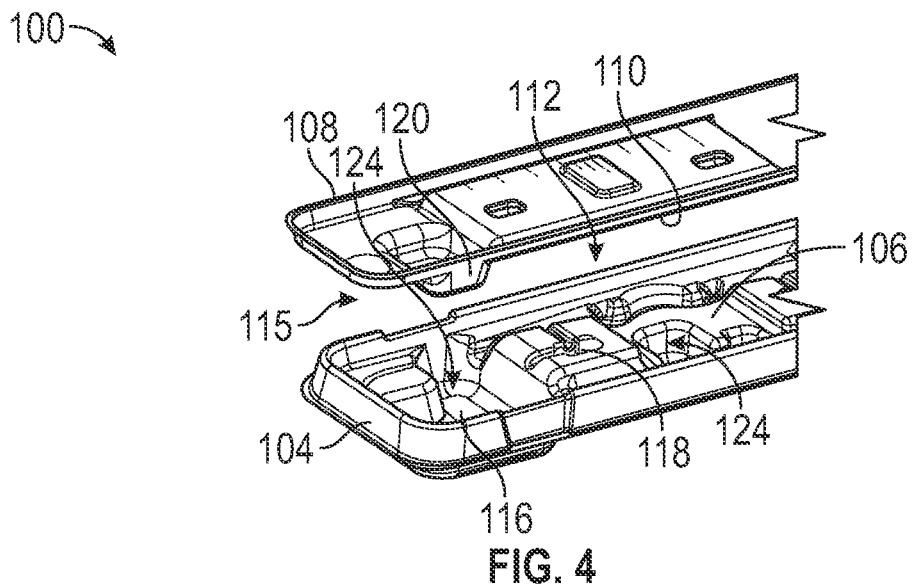
FIG. 4 illustrates a perspective view of a portion of the packaging of FIG. 1 showing portions of the base and lid according to an aspect of the disclosure.

With continued reference to FIGS. 1 and 2 and also to FIGS. 3-6, the base 104 includes a surface 106 configured to receive the one or more components thereon (FIGS. 3 and 4). The surface 106 may define one or more depressions 116 thereon (see FIG. 3, for example). The depressions 116 are defined in a concave manner on the surface 106. The depressions 116 are configured to receive components of the DDS 300 and/or the dock assembly 200. It will be appreciated that the base 104 is not limited to exactly those or only those depressions 116 labeled in FIG. 3, and that other quantities and arrangements of depressions 116 may be utilized. The depressions 116 can be dimensioned such that they can receive the entirety of the dock assembly 200 and/or the DDS 300 therein. Alternatively, the depressions 116 may be configured to receive portions of the dock assembly 200 and/or the DDS 300.

The lid 108 may define a plurality of protrusions 120 (FIG. 4). The shapes and dimensions of the protrusions 120 on the lid 108 may complement the shapes and dimensions of the depressions 116 on the base 104. In some aspects, the packaging 100 may include depressions 116 on the base 104 and be devoid of protrusions 120 on the lid 108. In alternative aspects, the packaging 100 may include protrusions 120 on the lid 108 and be devoid of depressions 116 on the base. In further alternative aspects, the packaging 100 may include both, depressions 116 on the base 104 and protrusions 120 on the lid 108.

When the packaging 100 is in the closed configuration, one or more receptacles 124 may be defined between complementary depressions 116 on the base 104 and protrusions 120 on the lid 108 (FIG. 4). The receptacle(s) 124 may be configured to receive and secure one or more components of the dock assembly 200 and/or the DDS 300. The receptacle(s) 124 may be dimensioned to at least partly complement the size and shape of the component disposed therein, such that movement of the components is obstructed between the base 104 and the lid 108 (and specifically between the depression 116 and the protrusion 120) when the packaging 100 is in the closed configuration. This prevents components from shifting during storage or shipment, and prevents damage to the components. Preventing the components from moving when the packaging 100 is closed can be further advantageous in that particular components are arranged and secured in a desired orientation relative to the packaging 100 or to the other components. Retaining the components in the desired orientations when the packaging 100 is closed prevents damage to the components, increases effectiveness of sterilization, reduces chance of human error upon unpacking, and simplifies conditioning of the components upon unpacking.

The base 104 and/or the lid 108 may define a plurality of retention members 118 (see FIG. 3 for example) extending therefrom. It will be appreciated that the base 104 and the lid 108 are not limited to exactly those or only those retention members 118 labeled in FIG. 3, and that other quantities and arrangements of retention members 118 may be utilized. The retention members 118 may extend from the base 104 towards the lid 108 when the packaging is in the closed configuration and/or from the lid 108 toward the base 104. In some aspects, the retention members 118 may extend into one or more of the receptacles 124 defined between the base 104 and the lid 108. The retention members 118 are configured to contact one or more components disposed on the base 104 or the lid 108, for example the dock assembly 200 and/or the DDS 300. The retention members 118 may be configured to releasably hold a component on the base 104, on the lid 108, or within a receptacle 124. In some aspects, the retention members 118 may be protrusions that are configured to deflect to allow a component to be moved to the desired place on the base 104 or the lid 108 and to prevent the component from being moved out of the desired location (e.g., as shown in FIGS. 1-6). In some aspects, the retention members 118 may be fasteners that can be placed on the components to secure the components to the base 104, to the lid 108, or in a receptacle 124 (e.g., see FIGS. 22 to 29I).

Figure 5:
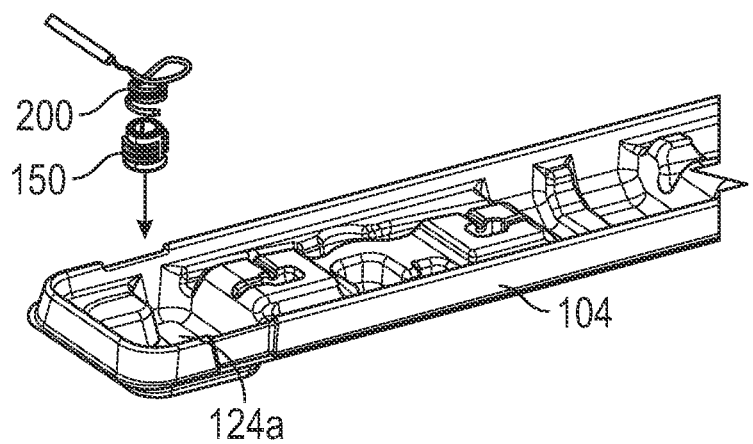
FIG. 5 illustrates a perspective view of a portion of the base of the packaging of FIG. 1 and showing a dock assembly and dock holder according to an aspect of the disclosure.
Figure 6:
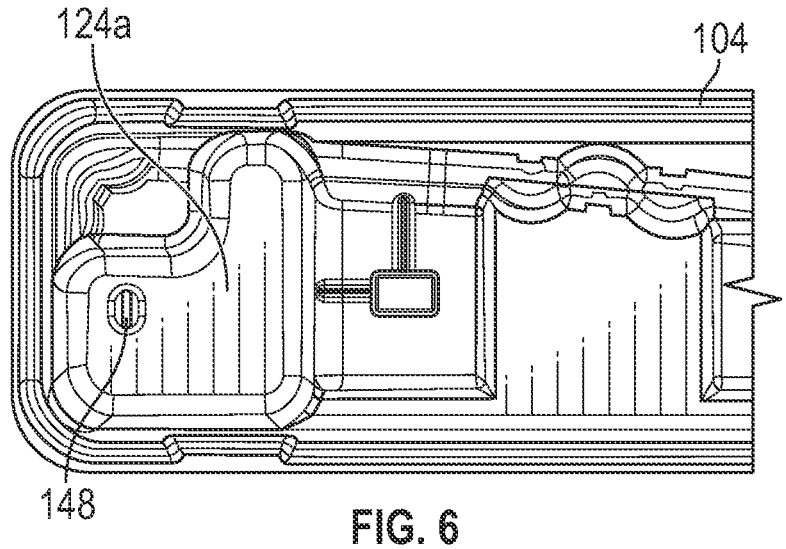
FIG. 6 illustrates a top perspective view of a portion of the base of FIG. 5 according to an aspect of the disclosure.

In some aspects, one of the receptacles 124 defined between the base 104 and the lid 108 may be a dock receptacle 124a that is configured to receive the dock assembly 200 therein (see FIGS. 3, 5 and 6). The dock receptacle 124a can be sized and dimensioned in such a way as to receive the dock assembly 200 and also to receive a liquid therein such that the dock assembly 200 is at least partly submerged in the liquid in the dock receptacle 124a. The dock receptacle 124a can be configured to retain the liquid for a predetermined time sufficient to condition the dock assembly 200, as will be described in further detail below. It will be appreciated that the dock receptacle 124a may be formed to have various sizes, cross-sectional shapes, and volumes based on the desired quantity of liquid to be introduced therein and/or on the size and shape of the dock assembly 200.

In some aspects, the dock receptacle 124a can be a monolithic unitary component with the rest of the base 104. Alternatively, the dock receptacle 124a may be a separate component from the base 104 that is configured to engage with the base 104. The dock receptacle 124a may be formed from the same material as the rest of the base 104. Alternatively, the dock receptacle 124a may be formed from a different material, so long as the dock receptacle 124a comprises material that permits the desired liquid (e.g., saline) to be retained within the dock receptacle 124a for the desired duration. In some aspects, the dock receptacle 124a may comprise a coating thereon, the coating being configured to contact the liquid in the dock receptacle 124a and to prevent the liquid from being absorbed into or leaking through the dock receptacle 124a.

The packaging 100 may comprise various materials, such as plastic, paper, or a combination of plastic and paper. Other materials may be utilized as well, and this disclosure is not limited to any particular material. In some aspects, the packaging 100 may include a thermoplastic polymer, such as acrylonitrile butadiene styrene (ABS) or polyethylene terephthalate, and specifically for example polyethylene terephthalate glycol (PETG). In some aspects, it may be advantageous to manufacture the packaging 100 at least partly via vacuum and pressure-forming techniques or by thermoforming. Other suitable materials that can be thermoformed that retain the necessary structural and biocompatibility parameters may also be utilized. The packaging 100 may be formed via injection molding. In some aspects, the packaging 100 may include flashspun high-density polyethylene fibers, such as Tyvek.

The dock receptacle 124a is configured to receive the dock assembly 200 therein. The dock assembly 200 may be placed into and stored in the dock receptacle 124a, and in some examples along with a portion of the DDS 300 connected to the dock assembly 200. The dock receptacle 124a may be sealed between the base 104 and the lid 108 with the dock assembly 200 therein when the base 104 and the lid 108 are engaged and the packaging 100 is in the closed configuration. In some aspects, the dock assembly 200 may be connected to the DDS 300 when the dock assembly 200 and the DDS 300 are both within their respective receptacles 124 in the packaging 100 (e.g., receptacles 124a-124f shown in FIG. 3 and as described further below). As such, the dock receptacle 124a should be configured to communicate, at least in part, with at least one other receptacle 124 that retains one or more components of the DDS 300 (e.g., receptacles 124b-124f in FIG. 3), for example, the portion of the DDS 300 that is attached to the dock assembly 200.

The dock assembly 200 may be retained within the packaging 100 to prevent the dock assembly 200 from shifting during packaging, storage, transportation, or preparation, which may decrease the chance of damaging the dock assembly 200. In some aspects, individual components of the dock assembly 200 may be retained relative to one another to better secure the dock assembly 200 and to protect individual components. Furthermore, where the dock assembly 200 and the DDS 300 are connected and are packaged together, properly securing the dock assembly 200 within the packaging 100 prevents any movement of the dock assembly 200 which can cause undesired movement or twisting of the DDS 300, thus decreasing risk of damage to the DDS 300 or related components. The DDS 300, including various components that comprise the DDS 300, may also be retained within the packaging 100 to prevent undesired movement, shifting, or twisting when the packaging is in the closed configuration. The DDS 300 and its related components may be held in a desired orientation relative to each other, the dock assembly 200, and/or the packaging 100.

To retain the dock assembly 200 within the packaging 100, a dock holder 150 may be disposed within the packaging 100 (FIGS. 1, 2, and 5). The dock holder 150 is configured to receive at least a portion of the dock assembly 200. The dock holder 150 can contact the dock assembly 200 such that the dock assembly 200 is retained in the desired location in the packaging 100 (e.g., within the dock receptacle 124a) and at the desired orientation relative to the packaging 100, another component of the dock assembly 200, and/or the DDS 300. The dock holder 150 provides a secure way to package and protect the dock assembly 200. The dock holder 150 may be further configured to maintain different portions of the dock assembly 200 in desired locations relative to each other (e.g., separating multiple, adjacent coils of the dock assembly 200 to prevent sticking or friction between them). The dock holder 150 may also facilitate sterilization of the dock assembly 200 when the dock assembly 200 is on the dock holder 150. The dock holder 150 may be positioned and designed such that the dock assembly 200 may be moved from the dock holder 150 into the DDS 300.

Referring to FIGS. 7-10, a dock holder 150, according to an example is shown. The dock holder 150 includes a body 154 having a proximal end 158 and a distal end 162 opposite the proximal end 158. A central axis A extends between the proximal end 158 and the distal end 162, through a center of the dock holder 150. The body 154 may be substantially cylindrical, but it will be appreciated that other shapes can be utilized and will depend on the dock assembly 200 that the dock holder 150 will be designed to receive and retain. The body 154 has an exterior surface 166 and an interior surface 170 opposite the exterior surface 166 and spaced from the exterior surface 166 along a radial direction toward the central axis A. The interior surface 170 defines a bore 174 extending through the body 154. The bore 174 may be a through bore that extends along the entirety of the body 154 and opens at both the proximal end 158 and the distal end 162. Alternatively, the bore 174 may be a blind bore that extends along a portion of the body 154 and opens at the proximal end 158 but does not open at the distal end 162.

The dock holder 150 is configured to releasably attach to the packaging 100 such that the dock holder 150 is secured relative to the packaging 100. In some aspects, the dock holder 150 can attach to the base 104. The base 104 may define a post 148 extending from the base 104 and configured to receive the dock holder 150 (see FIG. 6). The post 148 may be a continuous unitary part of the base 104. The dock holder 150 is configured to slide over the post 148 such that post 148 is received inside the bore 174 of the dock holder 150. The dock holder 150 may be configured to be releasably secured to the post 148, or, alternatively, the dock holder 150 may be designed such that once the dock holder 150 is properly secured to the post 148 the dock holder 150 is not intended to be separated from the post 148.

Figure 7:
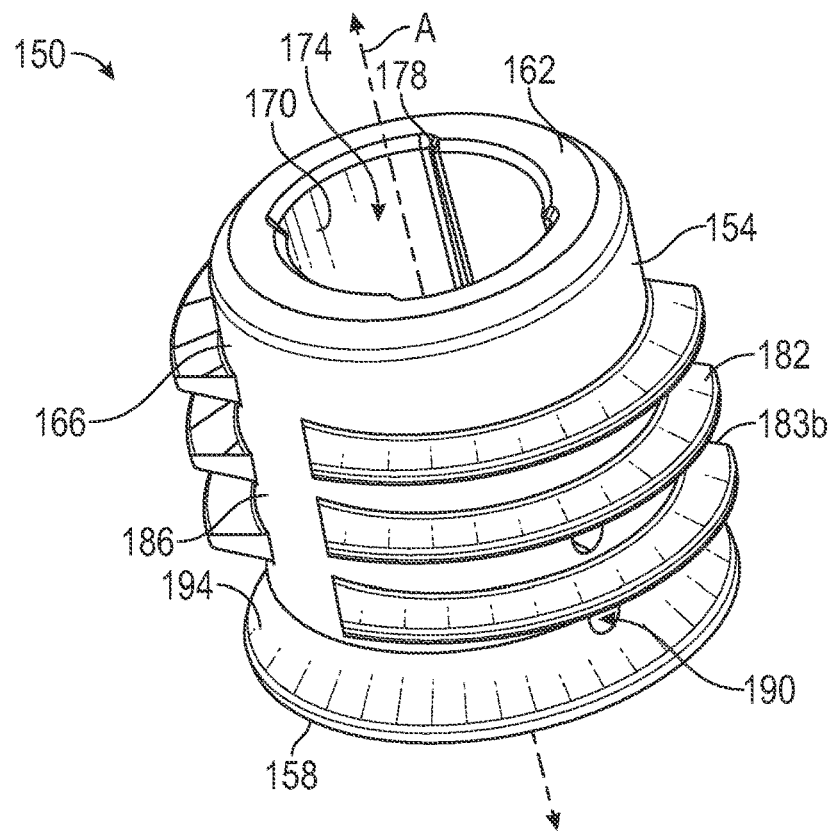
FIG. 7 illustrates a perspective view of a dock holder according to an aspect of the disclosure.
Figure 8:
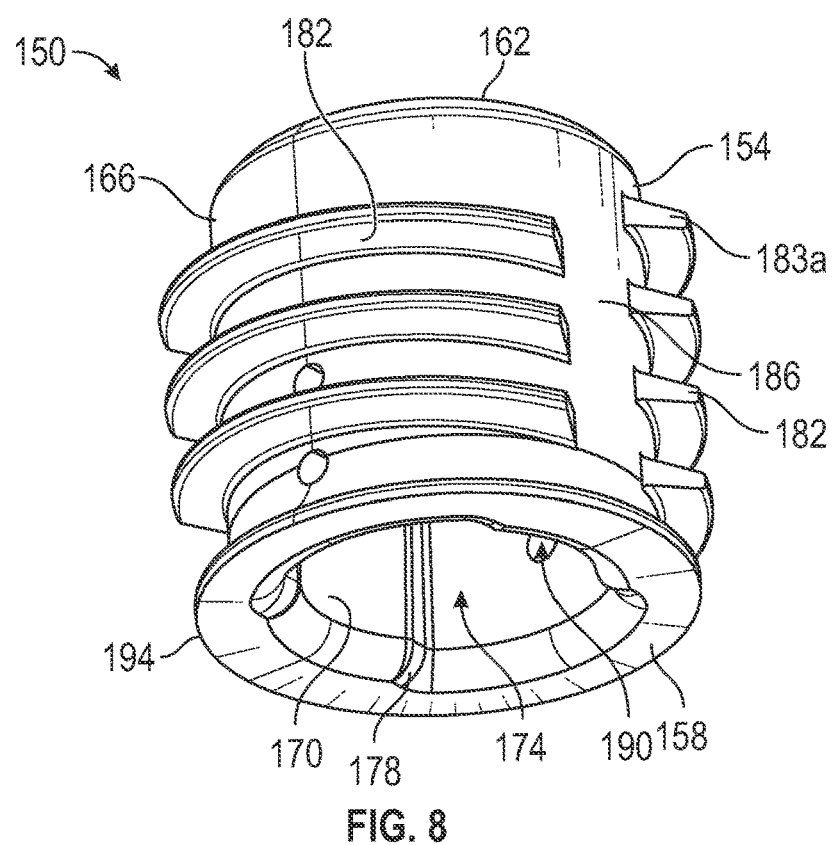
FIG. 8 illustrates another perspective view of the dock holder of FIG. 7.
Figure 9:
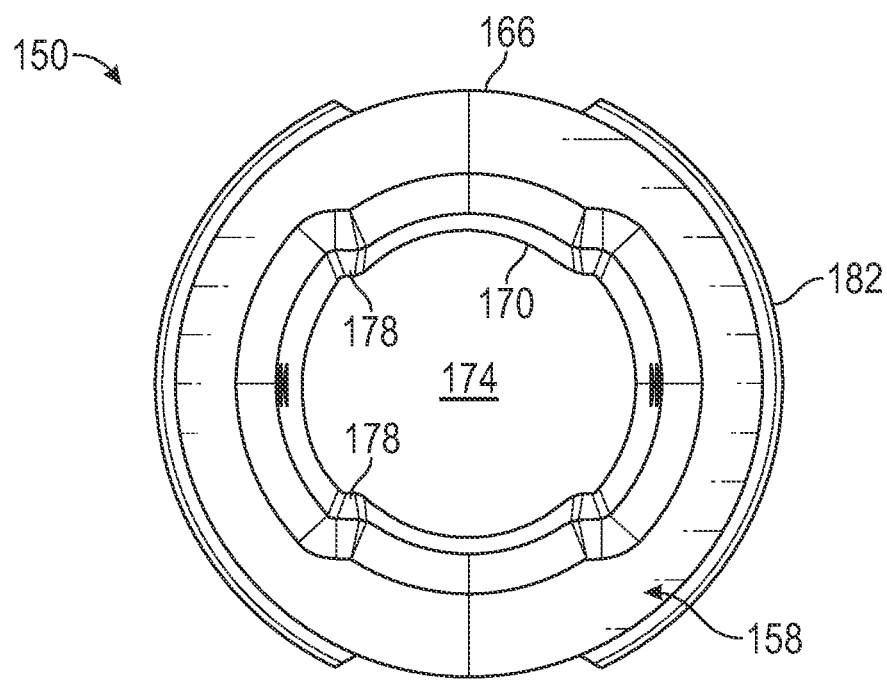
FIG. 9 illustrates a bottom plan view of the dock holder of FIG. 7.

In some aspects, it may be advantageous to ensure that the dock holder 150 is affixed to the packaging 100 according to a desired orientation. As such, the dock holder 150 and the post 148 may be designed such that the dock holder 150 can only be affixed to the post 148 in the desired orientation. As shown in FIGS. 7-9, the dock holder 150 may include one or more projections 178 extending from the interior surface 170 radially towards the central axis A. As seen in FIG. 9, for example, the projections 178 define a keyed cross-section (when viewed in a plane perpendicular to the central axis A) that can allow the dock holder 150 to receive the post 148 into the bore 174 only in the desired orientation (e.g., a desired rotational orientation).

The post 148 can be dimensioned and shaped to complement the keyed cross-section of the dock holder 150, such that the post 148 can only be received into the bore 174 when the post 148 is properly oriented and aligned with the keyed cross-section of the bore 174. As shown in the non-limiting example of FIG. 6, the post 148 may have a substantially rectangular cross-section configured to be received into the bore 174 between the projections 178. The corners of the post 148 can be curved, rounded, or beveled to correspond to the cross-sectional shape of the bore 174 of the dock holder 150. It will be understood that the post 148 may define other cross-sectional shapes and that the bore 174 can define other cross-sectional openings that complement and correspond to the cross-sectional shape of the post 148.

In some aspects, the dock holder 150 may include a flange 194 adjacent the proximal end 158 (FIGS. 7-10). The flange 194 can flare radially outward, thereby creating a flared base at the proximal end 158. The flange 194 may extend circumferentially around the body 154 and may contact the base 104 when the dock holder 150 is affixed thereon. In some aspects, the dock holder 150 may be part of (e.g., molded or formed as one piece with) a single unitary base 104 rather than be a separate removable component.

The dock holder 150 is configured to receive the dock assembly 200 thereon. For example, the dock assembly 200 may be wrapped around the dock holder 150 such that at least a portion of the dock assembly 200 circumferentially surrounds the dock holder 150 around the exterior surface 166. In some aspects, the dock holder 150 may include features thereon to facilitate reception and retention of the dock assembly 200 in a desired position and orientation.

The dock holder 150 can comprise a protrusion extending radially outward from the exterior surface 166 and that is configured to receive the dock assembly thereon. Referring again to FIGS. 7, 8, and 10, in some aspects, the protrusion of the dock holder 150 may be configured as one or more threads 182 extending from the exterior surface 166 in a radial direction away from the central axis A. The threads 182 extend circumferentially at least partly around the body 154. Each thread 182 has a length measured from a thread lead 183a, where the thread 182 beings, and a thread end 183b, where the thread 182 ends (FIGS. 7 and 8). The thread lead 183a is the portion of the thread 182 closest to the distal end 162 of the body 154 of the dock holder 150, and the thread end 183b is the portion of the thread 182 closest to the proximal end 158 of the body 154. The threads 182 are configured to receive the dock assembly 200 thereon as the dock assembly 200 is wrapped around the body 154.

The dock holders 150 disclosed herein can have various retention features for receiving and securing the dock assembly 200 thereon. In some aspects, the threads 182 can have various arrangements, dimensions, sizes, and angles that depend on the intended use, the packaging into which the dock holder 150 is inserted, and the type of dock assembly 200 being received thereon. Referring to FIGS. 7-10 again, in some aspects, the dock holder 150 may have a single thread 182 that extends helically around the body 154 between the proximal end 158 and the distal end 162. The thread 182 may be continuous in some aspects or discontinuous in other aspects.

Figure 10:
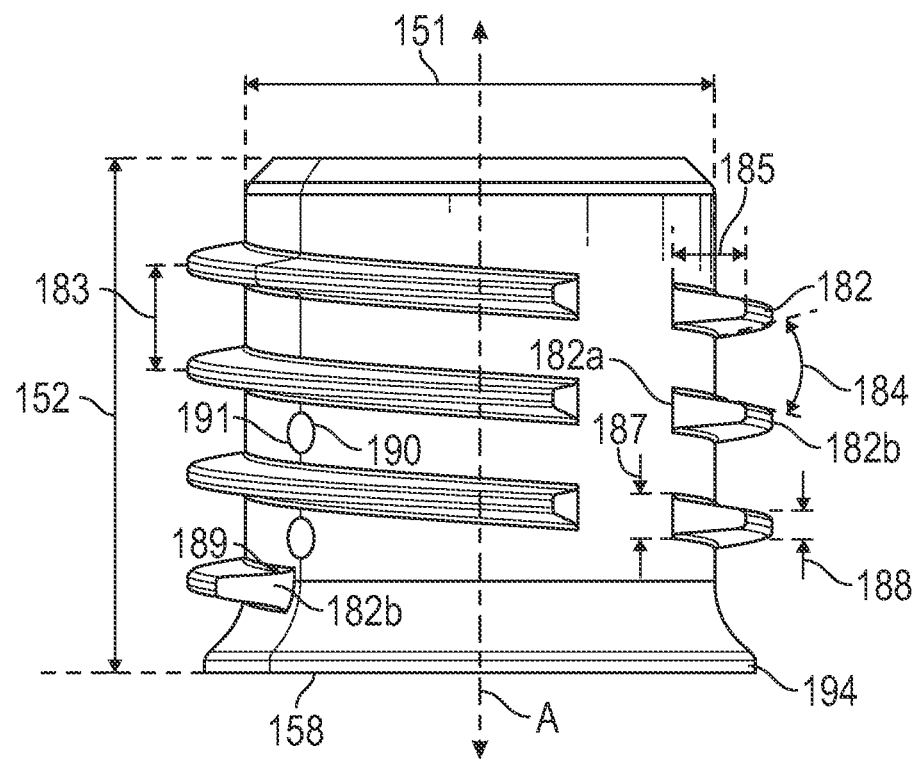
FIG. 10 illustrates a front elevation view of the dock holder of FIG. 7.

As shown in FIGS. 7, 8, and 10, the thread 182 may have multiple breaks 186 therein, such that a plurality of discontinuous portions of the thread 182 are defined along the thread 182 between the thread lead 183a and the thread end 183b. The breaks 186 are defined between adjacent portions of the thread 182 along the length of the thread 182 as it helically extends around the body 154. In some aspects, at least some of the plurality of breaks 186 may be aligned along the exterior surface 166 of the body 154 along a direction parallel to the central axis A.

For example, the thread lead 183a and thread end 183n of each thread 182 can be spaced apart from one another in a circumferential direction to create the break 186 in the thread 182. The breaks 186 of the adjacent threads 182 can be aligned in the axial direction such that a space without threads 182 is formed along the exterior surface 166 of the body 154, between the proximal end 158 and the distal end 162.

The presence of breaks 186 along the thread 182 allows for better access of a sterilization medium to the dock assembly 200 while the dock assembly 200 is contacting the threads 182. Providing discontinuous threads 182 helps increase the surface area of the dock assembly 200 that is not in contact with the dock holder 150. Furthermore, providing discontinuous threads 182 may facilitate formation and manufacturing of the dock holder 150 such that sharp edges are eliminated or sharp edges are spaced away from the dock assembly 200 and not configured to contact the dock assembly 200 when the dock assembly 200 is received onto the dock holder 150. This decreases chances of a sharp edge contacting or catching on the dock assembly 200 and causing damage thereto during introduction of the dock assembly 200 onto the dock holder 150, during storage and shipment, and during retraction of the dock assembly 200 from the dock holder 150.

In some aspects, the thread 182 may include a non-helical portion that extends circumferentially around at least a portion of the body 154 such that the non-helical portion is within a same plane along its entire length (the plane being perpendicular to the central axis A).

In some aspects, the thread 182 includes only one or more helical portions. The threads 182 may have various thread parameters and measurements, including, for example, thread length, pitch, crest, root, major diameter, minor diameter, thread angle, pitch diameter, thread depth, and/or other parameters of helical threads. It will be appreciated that the particular dimensions and measurements of the thread 182 will depend on the dock assembly 200 intended to be received onto the dock holder 150.

As shown in FIG. 10, the dock holder 150 may have a pitch 183 that is measured between the same points of two adjacent portions of the thread 182 along a direction parallel to the central axis A. In some aspects, the pitch 183 may be between about 0.02 inch and about 1.0 inch (0.05 cm to 2.54 cm), between about 0.1 inch (0.25 cm) and about 0.5 inch (1.27 cm), between about 0.15 inch (0.38 cm) and about 0.2 inch (0.51 cm), a combination of any of the above ranges, or another suitable range. The dock holder 150 may further define a thread depth 185, measured from the exterior surface 166 outward in a radial direction away from the central axis A to the edge of the thread 182. Specifically, the thread depth 185 is measured between a base 182a of the thread 182 and a tip 182b of the thread 182. The thread 182 may be tapered in a radial direction away from the central axis A, such that the base 182a of the thread 182 (the portion closest to the exterior surface 166) is the widest portion of the thread 182 and has a height 187, and the tip 182b of the thread 182 (the farthest from the exterior surface 166) is the narrowest portion of the thread 182 and has a height 188 that is smaller than the height 187 of the base. In some aspects, the thread depth may be in the range of from about 0.01 inch (0.03 cm) to about 1.5 inch (3.81 cm), about 0.05 inch (0.13 cm) to about 1 inch (2.54 cm), about 0.1 inch (0.25 cm) to about 0.5 inch (1.27 cm), a combination of any of the above ranges, or another suitable range. The thread 182 may define a particular thread angle 184 measured between adjacent portions of the thread 182 along a direction parallel to the central axis A. In some aspects, the thread angle 184 may be between about 0 degrees (i.e. a non-spiral thread) and about 90 degrees, between about 0 degrees and about 60 degrees, between about 0 degrees and about 45 degrees, between about 0 degrees and about 30 degrees, or another suitable angle. The attachment of the thread 182 to the body 154 may be a rounded attachment, such that the base 182a of the thread 182 and the exterior surface 166 define a particular radius of curvature 189.

The dock holder 150 may be substantially cylindrical and may have a cross-sectional diameter 151 (measured perpendicular to the central axis A, as shown in FIG. 10). In some aspects, the cross-sectional diameter 151 may be between about 0.1 inch (0.25 cm) and about 3 inch (7.62 cm), between about 0.2 inch (0.51 cm) and about 2 inch (5.08 cm), between about 0.3 inch (0.76) and about 1.5 inch (3.81 cm), between about 0.4 inch (1.02 cm) and about 1 inch (2.54 cm), or within a combination of the above ranges. The dock holder 150 may further define a height 152 measured along the central axis A between the proximal end 158 and the distal end 162 (FIG. 10). In some aspects, the height 152 may be between about 0.1 inch (0.25 cm) and about 3 inch (7.62 cm), between about 0.2 inch (0.51 cm) and about 2 inch (5.08 cm), between about 0.3 inch (0.76 cm) and about 1.5 inch (3.81 cm), between about 0.4 inch (1.02 cm) and about 1 inch (2.54 cm), or within a combination of the above ranges.

Figure 11A:
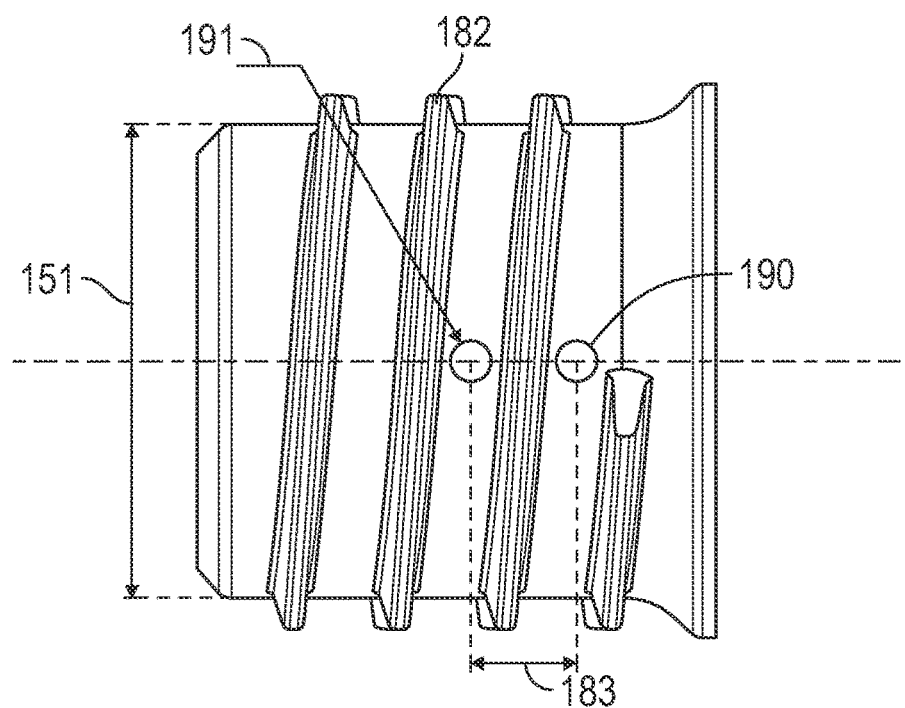
FIG. 11A illustrates a side elevation view of a dock holder according to another aspect of the disclosure.
Figure 11B:
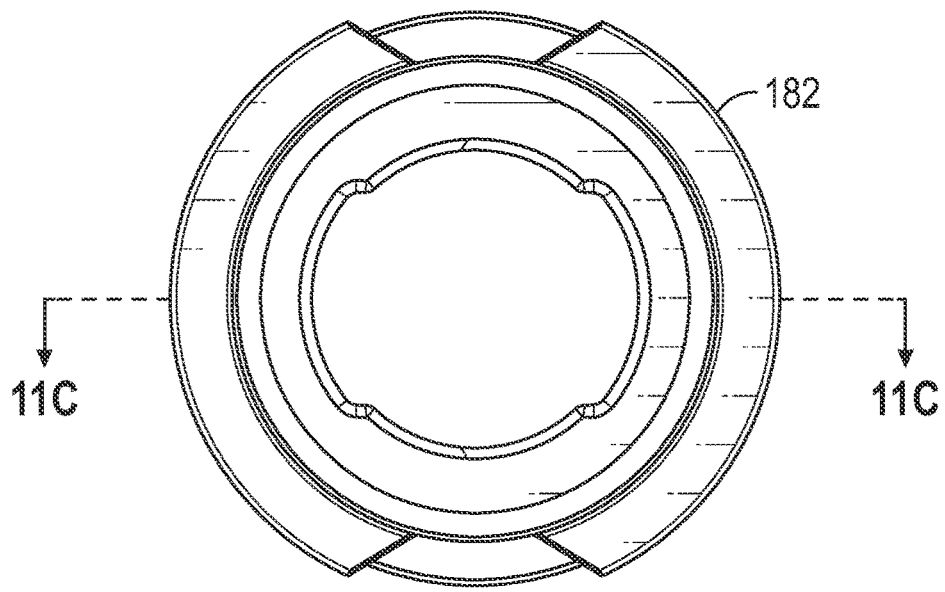
FIG. 11B illustrates a top plan view of the dock holder of FIG. 11A.
Figure 11C:
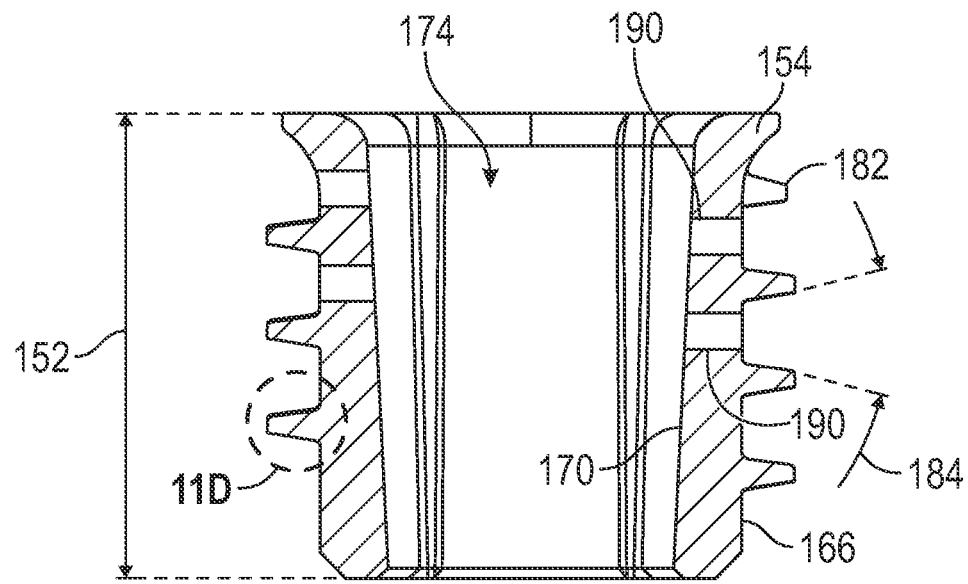
FIG. 11C illustrates a front cross-sectional view of the dock holder of FIG. 11A.
Figure 11D:
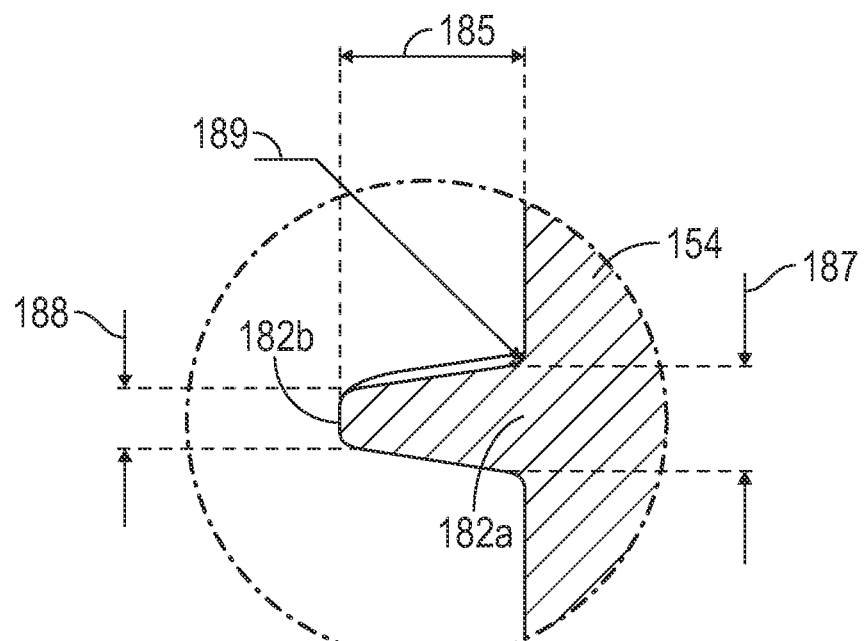
FIG. 11D illustrates a front cross-sectional view of a portion of the dock holder of FIG. 11A.

Referring to FIGS. 11A-11D, a non-limiting example of a dock holder 150 is depicted having particular measurements and dimensions. It should be understood that the values depicted with respect to these figures are exemplary and are not meant to constrain or otherwise limit the scope of this application. As shown in FIGS. 11A-11D, an exemplary dock holder 150 may have a thread 182 having a pitch 183 of about 0.18 inch (0.46 cm) (FIG. 11A). The thread 182 may have a thread angle 184 of about 17 degrees (FIG. 11C). The thread 182 may have a thread depth 185 of about 0.1 inch (0.25 cm) (FIG. 11D). In some aspects, the base 182a may have a height 187 of about 0.057 inch (0.14 cm) (FIG. 11D), measured in a direction parallel to the central axis A. The tip 182b may have a height 188 of about 0.033 inch (0.085 cm) (FIG. 11D), measured in the same direction parallel to the central axis A. The attachment of the thread 182 to the body 154 may be a rounded attachment, such that the base of the thread 182 and the exterior surface 166 define a radius of curvature. In some aspects, the radius of curvature 189 may be about 0.01 inch (0.03 cm) (FIG. 11D). In some exemplary aspects, such as those depicted in FIGS. 11A-11D, the dock holder 150 may have a cross-sectional diameter 151 of about 0.8 inches (2.03 cm) (FIG. 11A) and a height 152 of about 0.88 inch (2.24 cm) (FIG. 11C).

In some aspects, the thread 182 may extend around the body 154 of the dock holder 150 for less than one revolution. In some aspects, the thread 182 may extend around the body 154 for one or more revolutions. In some aspects, for example in FIGS. 11A-11D, the thread 182 may extend for about 3.21 revolutions around the body 154.

In some examples, as shown in FIGS. 10, 11A, and 11C, the dock holder 150 may further include an opening 190 extending through the body 154 between the exterior surface 166 and the interior surface 170, such that the exterior surface 166 is in fluid communication with the bore 174 (FIG. 11C). The opening 190 can have a central axis (extending through a center of the opening 190) that is defined in a radial direction and that is perpendicular to the central axis A.

The opening 190 may be disposed on the body 154 between adjacent threads 182 or thread portions of the thread 182. In some aspects, the dock holder 150 may define a plurality of openings 190 thereon. The openings 190 provide additional access to the dock assembly 200 when the dock assembly 200 is on the dock holder 150.

The dock assembly 200 is configured to be received circumferentially around the body 154 of the dock holder 150, such that at least a portion of the dock assembly 200 rests on the threads 182. During sterilization, flushing, and/or other preparation of the dock assembly 200, it may be advantageous to provide access to increased surface area of the dock assembly 200. The openings 190 can be adjacent to the dock assembly 200 when the docking device is on the dock holder 150 and contacting the threads 182.

The openings 190 may be substantially circular, but it will be understood that in other aspects, the openings 190 may be a different cross-sectional shape, such as elliptical, triangular, rectangular, or another suitable cross-section. In some aspects, each opening 190 is circular and may have a diameter 191 of between about 0.01 inch (0.03 cm) and about 0.2 inch (0.51 cm). In some particular examples, such as shown in the non-limiting example of FIGS. 11A-11D, the diameter 191 may be about 0.063 inch (0.16 cm).

The dock holder 150 may be formed of any suitable material that can be contacted by the dock assembly 200, that can be exposed to liquid in which the dock assembly 200 will be conditioned (e.g., saline), that can be sterilizable, and that will not adversely affect biocompatibility of the dock assembly 200. In some aspects, the dock holder 150 may comprise a plastic material, such as acetal homopolymer, natural (Delrin 500p Nc010). It will be understood that other suitable materials may be utilized and that the dock holder 150 may comprise a plurality of suitable materials. In some aspects, the dock holder 150 may comprise ABS. In some aspects, the dock holder 150 may include a material suitable for injection molding.

Figure 12:
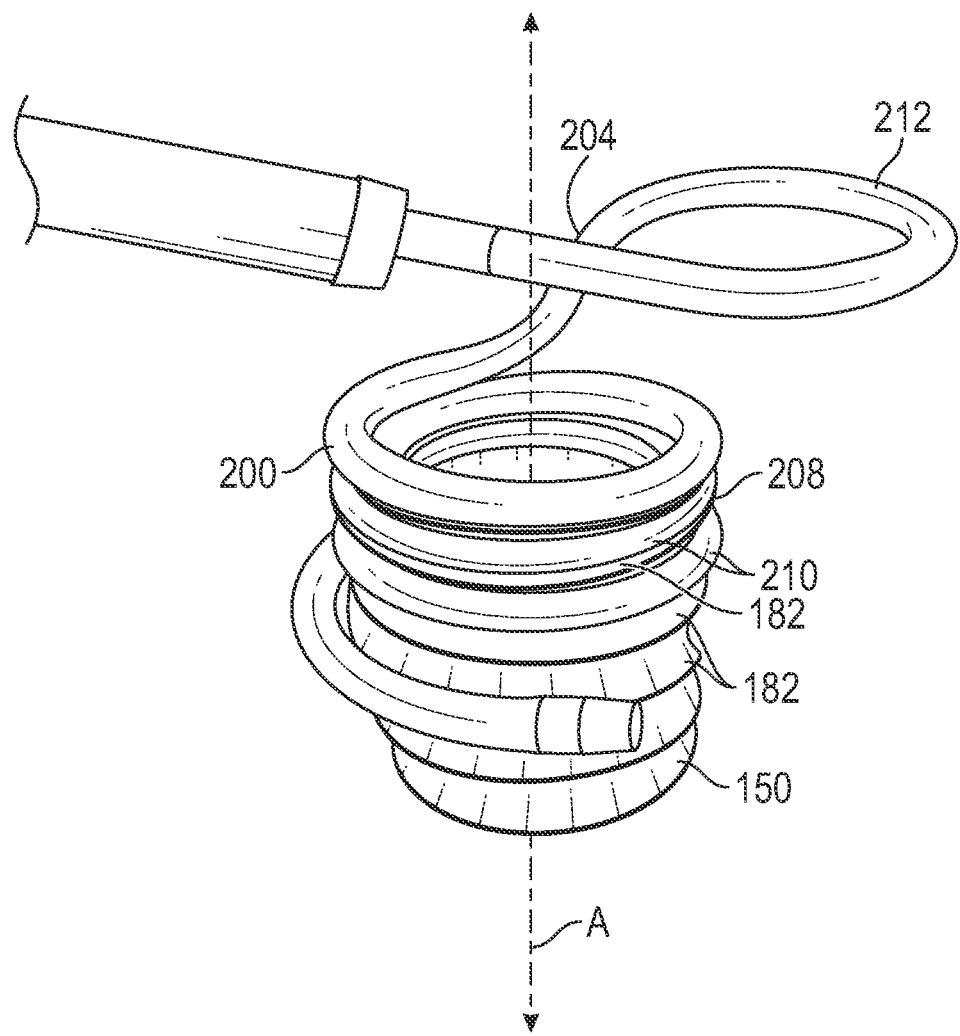
FIG. 12 illustrates a perspective view of a dock holder and a dock assembly according to an aspect of the disclosure.

The dock holder 150 may be affixed to the packaging 100 when the dock assembly 200 is introduced thereon. Alternatively, in some aspects, the dock holder 150 may be separated from the rest of the packaging 100 when the dock assembly 200 is first introduced thereon. FIG. 12 depicts an example of the dock assembly 200 being placed onto the dock holder 150. The dock assembly 200, which may include a helical coil shape, is oriented about the central axis A such that the dock assembly 200 is axially aligned along the central axis A with the dock holder 150. The dock assembly 200 can then be moved axially along the central axis A towards the dock holder 150. During the axial movement, the dock assembly 200 is also rotated about the central axis A such that the dock assembly 200 engages the one or more threads 182 on the exterior surface 166 of the body 154 of the dock holder 150. The dock assembly 200 may be moved circumferentially and axially in a helical, screw-like motion relative to the dock holder 150, such that the dock assembly 200 follows the threads 182. The dock assembly 200 may be coiled around the dock holder 150 such that the threads 182 separate adjacent coils of the dock assembly 200 along a direction parallel to the central axis A. The dock assembly 200 can be continuously moved along the threads 182 until the dock assembly 200 is at a desired location and orientation relative to the dock holder 150. It should be understood that an opposite process can be utilized with similar results, where dock assembly 200 is kept still while the dock holder 150 is aligned, oriented, and moved axially and rotationally relative to the dock assembly 200. In some aspects, both of the dock assembly 200 and the dock holder 150 may be moved (e.g., rotated) relative to each other such that the engagement between the dock assembly 200 and the dock holder 150 is achieved to arrive at the desired position and orientation of the dock assembly 200 on the dock holder 150.

In some aspects, the dock assembly 200 includes an extension portion 204 that separates a first portion 208 from a second portion 212 of the dock assembly 200. The second portion 212 of the dock assembly 200 can comprise an atrial turn or coil of the dock assembly 200 (and thus the second portion 212 can be referred to as an atrial turn portion). The first portion 208 of the dock assembly 200 may comprise a plurality of adjacent coils 210 having a same or similar diameter, and may be referred to as functional coils of the dock assembly 200. The second portion 212 can have a diameter that is larger than the diameter of the adjacent coils 210 of the first portion 208 of the dock assembly 200. The first portion 208 can be coiled and configured to contact the threads 182. The first portion 208 can comprise two or more adjacent coils 210 that are continuous with one another (in a helical or circumferential direction) but separated from each other in the axial direction by the threads 182 of the dock holder 150 when mounted around the dock holder 150.

It may be advantageous to orient the dock assembly 200 on the dock holder 150 such, when the dock assembly 200 is fully engaged with the dock holder 150, the extension portion 204 is adjacent to the lead 183a of the thread 182 that is closest to the distal end 162. The extension portion 204 may also be facing away from the dock holder 150 in such aspects, such that part, most, or all of the threads 182 are disposed between the extension portion 204 and the proximal end 158 of the body 154. As such, the second portion 212 (or atrial turn portion) of the dock assembly 200 can be spaced away from the dock holder 150. Such an orientation helps protect the various portions of the dock assembly 200 from damage, for example, by positioning the extension portion 204, and the atrial turn portion 212 connected to the extension portion 204, such that it is not under strain when the dock assembly 200 is inserted into the packaging 100. It will be understood that the figures depict non-limiting examples and are not intended to constrain this disclosure to only the particular method shown.

Figure 13:
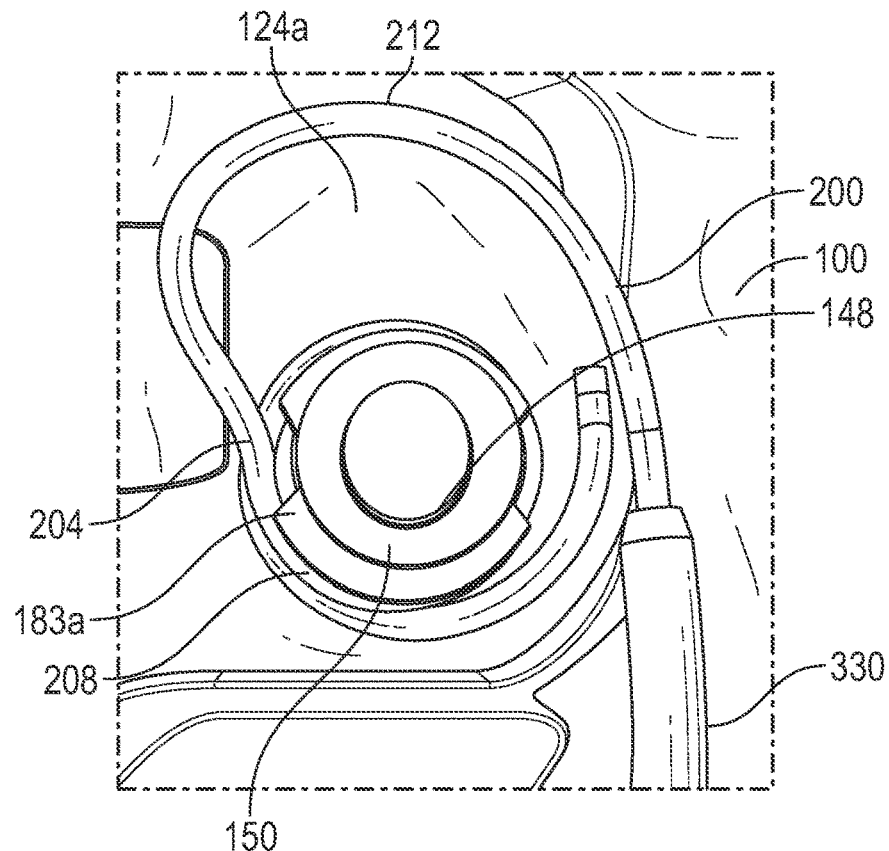
FIG. 13 illustrates a top plan view of a dock holder and dock assembly according to another aspect of the disclosure.
Figure 14:
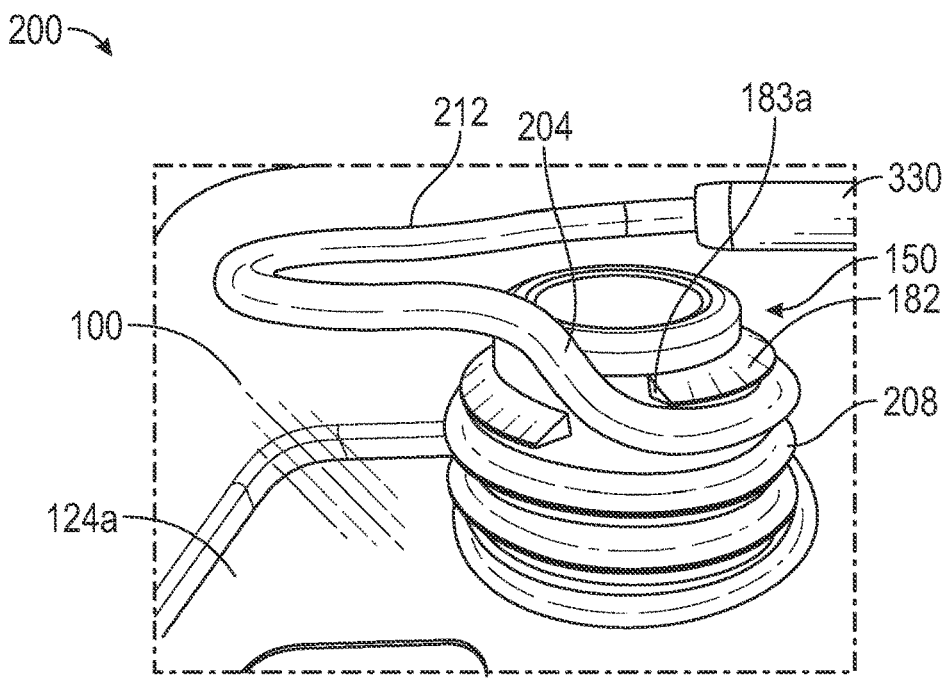
FIG. 14 illustrates a perspective view of the dock holder and dock assembly of FIG. 13.

When the dock assembly 200 is sufficiently engaged with the dock holder 150, the dock holder 150 can be affixed to the rest of the packaging 100. In some aspects, such as shown in FIGS. 13 and 14, the dock holder 150 may be moved into engagement with the post 148 defined on the packaging 100 as described above. The dock holder 150 may be fixedly attached to the post 148 such that the dock holder 150 and the dock assembly 200 thereon are both within the dock receptacle 124a.

Figure 17A:
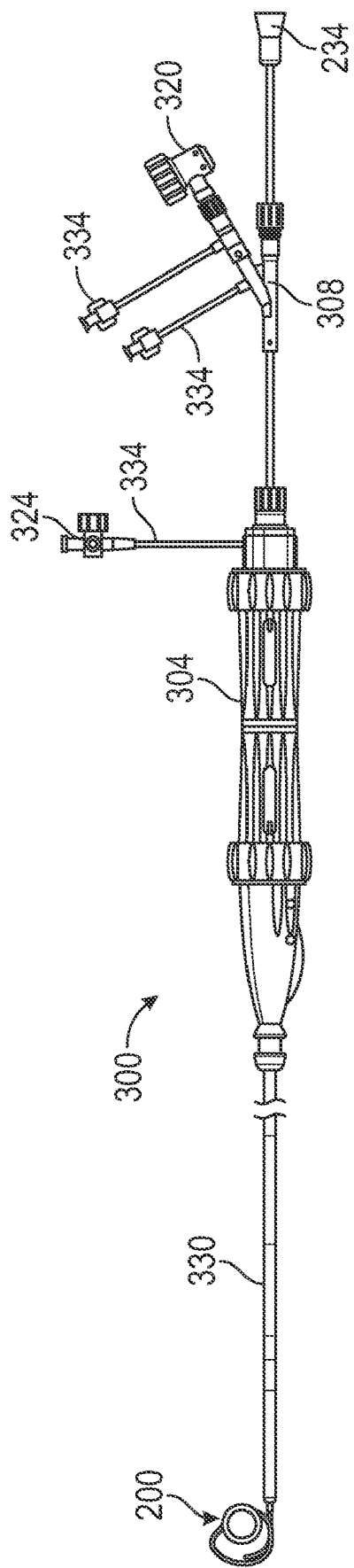
FIG. 17A illustrates a DDS according to an aspect of the disclosure.

FIG. 17A depicts a non-limiting exemplary DDS 300 that can be connected to the dock assembly 200 and that is configured to deliver the connected dock assembly 200 to a target implantation site. In some examples, the dock assembly 200 can be connected to the DDS 300 by one or more sutures. It will be appreciated that the DDS 300 of FIG. 17A is exemplary and other device delivery systems that are configured to receive and deliver a dock assembly are possible.

FIG. 17A depicts a DDS 300 having a handle 304 and a shaft 330 which extends distally from the handle 304 and the dock assembly partially deployed from a distal end of the shaft 330 (e.g., for illustration purpose). The shaft 330 can be configured to receive the dock assembly 200 (in an uncoiled or straight configuration) therein during delivery through a patient's vasculature to a target implantation site.

The DDS 300 can further include a y-connector assembly 308 (or hub assembly) extending proximally from the handle 304, and a suture lock assembly 320 connected to the y-connector assembly 308. Various flushing ports 334 are connected to the y-connector assembly 308 and the handle 304 (for example, a flushing port 334 connected to the handle 304 that includes a stopcock assembly 324). The DDS 300 can further include a sleeve handle 234 extending proximally from the y-connector assembly 308. It should be understood that the DDS 300 includes various other components and is not limited only to those described above. Further details of the DDS and its various components are described in International Application No. PCT/US2020/036577, which is incorporated by reference herein in its entirety.

Figure 15:
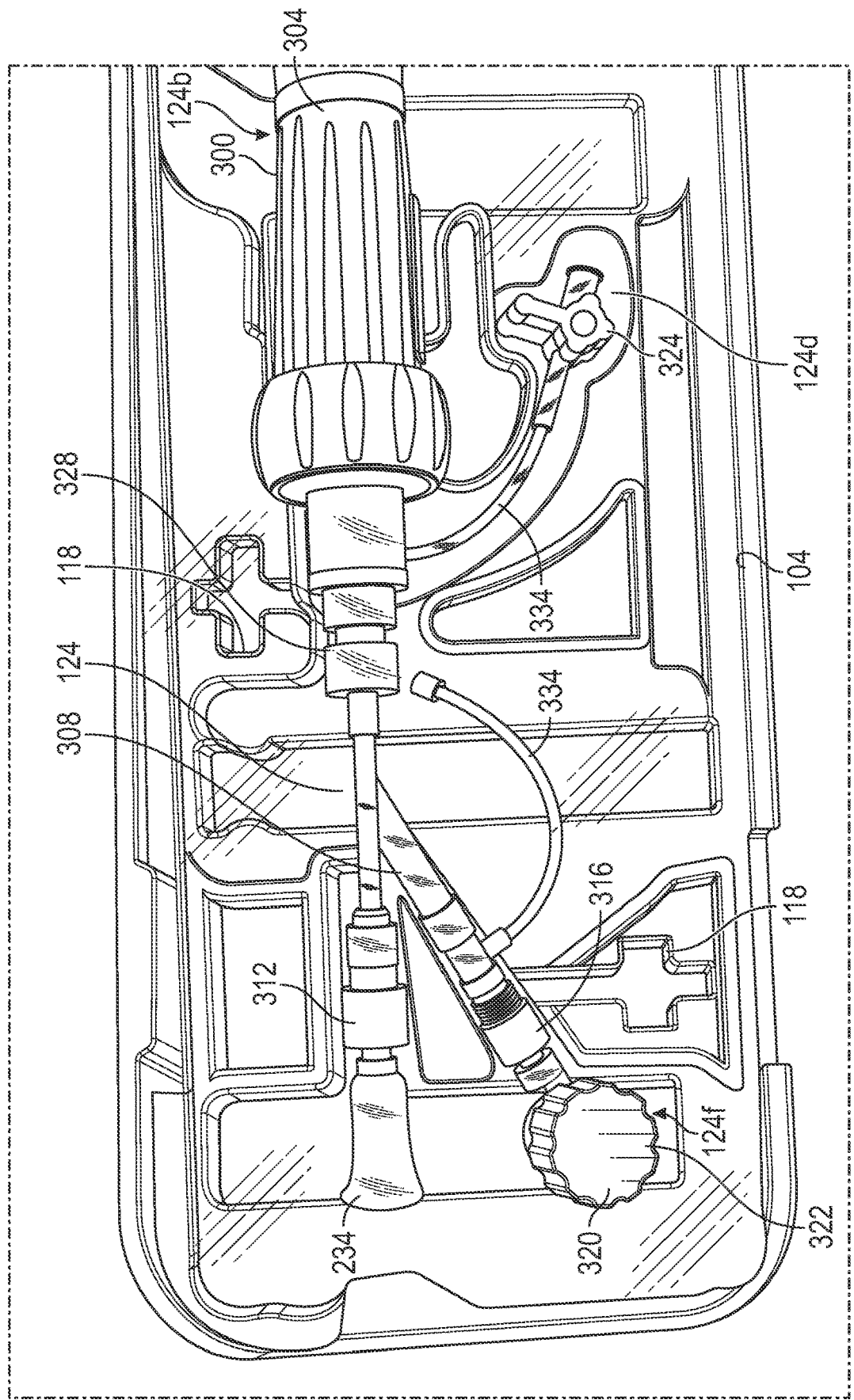
FIG. 15 illustrates a top plan view of a portion of a packaging including a proximal end of a DDS therein according to an aspect of the disclosure.
Figure 16:
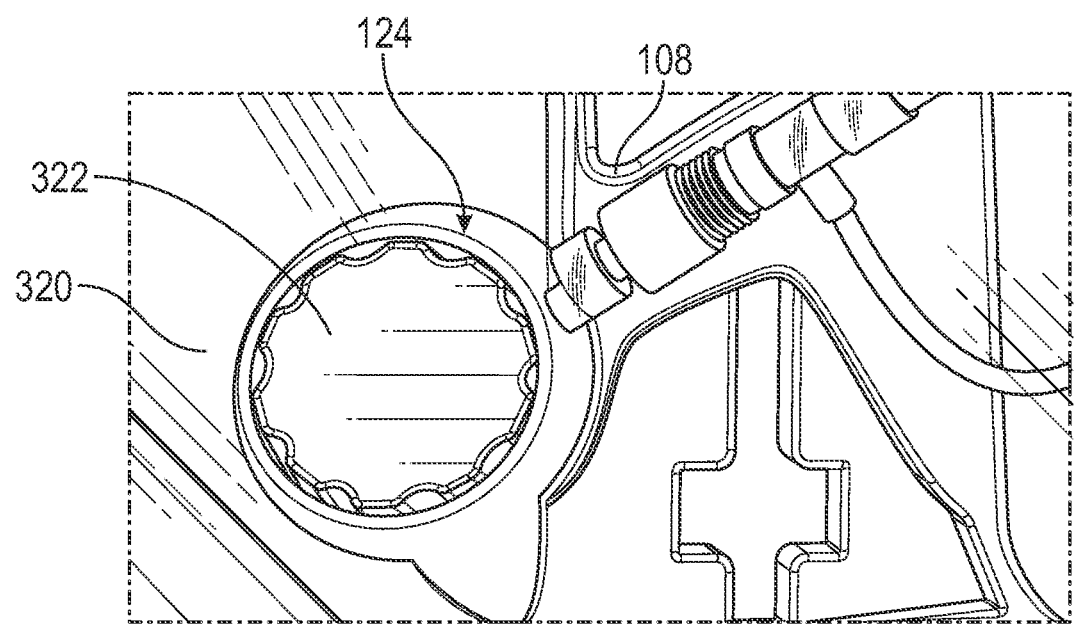
FIG. 16 illustrates a top plan view of a zoomed in portion of the packaging shown in FIG. 15.

In aspects where the dock assembly 200 and the DDS 300 are packaged into the same packaging 100, the DDS 300 may be introduced into the packaging 100, as shown in FIGS. 1, 2, 15, and/or 16. Referring to FIGS. 15 and 16, the DDS 300 may be aligned and oriented relative to features of the packaging 100 prior to being inserted into the packaging 100. Various portions of the DDS 300 can be introduced into respective receptacles 124 (receptacles 124b-124f shown in FIG. 3) as described above and further below. In some aspects, portions of the DDS 300 may be further contacted by retention members 118 as described above. The DDS 300 may be oriented and arranged within the packaging 100 based on a desired advantageous placement to protect the various components thereof and to facilitate proper removal of the DDS 300. Some exemplary components of a DDS 300 are depicted in FIGS. 15 and 16, but it will be appreciated that the DDS 300 includes additional components, and the packaging methods described herein are not limited to only those components shown in the figures. Some portions of the DDS 300 may be inspected before and after being placed into the packaging 100. The packaging 100, for example the base 104, may be formed to correspond to the shape of the various components of the DDS 300 to receive the components of the DDS 300 in the desired location and at the desired orientations.

During packaging, it may be advantageous to ensure that certain components of the DDS 300 are disposed in the packaging 100 as desired. For example, referring to FIG. 15, the handle 304 of the DDS 300 can be disposed in a handle receptacle 124b, and the y-connector assembly 308 that is connected to the handle 304 may be disposed in a y-connector assembly receptacle 124c. The suture lock assembly 320 may be disposed in yet a suture lock receptacle 124f, and the stopcock assembly 324 may be disposed in a stopcock receptacle 124d (FIG. 15). Additionally, the shaft 330 of the DDS 300 can be disposed in a shaft receptacle 124e (shown in FIG. 3).

During the packaging process, it may be beneficial to ensure that a suture lock handle 322 (or knob) of the suture lock assembly 320 is facing up (or outward) within the packaging, i.e., in a direction away from the base 104 (FIG. 15). Further, in some examples of the packaging process, a pusher knob 328 connected to the handle 304 should be screwed in, an outer sleeve cap 312 connected to the y-connector assembly 308 should be loose, and a swivel cap connected to the y-connector assembly 308 should be screwed on but not tightened.

In aspects where the packaging 100 includes a lid 108, the lid 108 may also include various protrusions 120 as described above (FIG. 4). The lid 108 can be formed such that, like the base 104, the lid 108 also corresponds in shape, protrusions 120, and other features thereon with the desired placement of the DDS 300 and its related components. For example, as shown in FIG. 16, the lid 108 includes a receptacle 124 that is configured to receive the suture lock handle 322 therein when the lid 108 is engaged with the base 104 and the packaging 100 is in the closed configuration. Such an arrangement helps maintain the suture lock handle 322 in the desired position to prevent twisting or disconnection of the suture lock handle 322 during packaging, storage, or transportation.

As introduced above with reference to FIGS. 3 and 4, the packaging 100 further comprises a plurality of retention members 118 configured to releasably secure various components (e.g., flushing ports 334) within or adjacent to their respective receptacles 124 (FIG. 15). The packaging 100 can further include a dock receptacle 124*a* configured to receive at least a portion of the dock assembly 200, as described herein (FIG. 3).

Figure 17B:
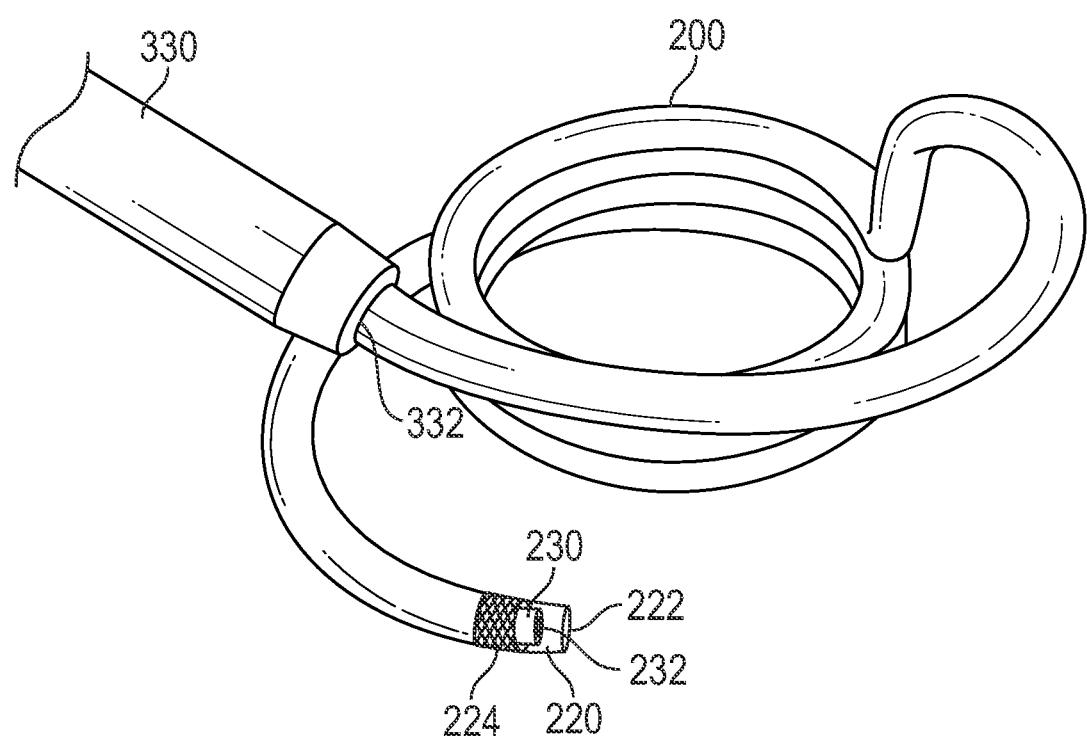
FIG. 17B illustrates a dock assembly coupled to a distal end of the DDS of FIG. 17A according to an aspect of the disclosure.

FIG. 17B depicts an exemplary dock assembly 200 that can be delivered to a target implantation site by a suitable DDS (such as the DDS 300 shown in FIG. 17A). The dock assembly 200 is shown extending distally out from a distal end of the shaft 330 of the DDS 300. The dock assembly 200 includes a sleeve 220 and a dock 230 within the sleeve 220. The dock 230 is configured to slidably move within the sleeve 220. The sleeve 220 and the dock 230 are configured to be moved relative to a distal end 332 of the shaft 330 of the DDS 300. The dock assembly 200 can be slidably moved within the shaft 330. For reference, this application will refer to a distal movement of the dock assembly 200 when the dock assembly 200 is being moved away from the shaft 330, and will refer to a proximal movement of the dock assembly 200 when the dock assembly 200 is being moved toward the shaft 330. The sleeve 220 has a distal end 222 and a marker band 224. The dock 230 has a distal end 232.

The disclosed methods of packaging may also include various additional steps, such as inspecting the different components, cleaning the packaging 100, the DDS 300, and/or the dock assembly 200, or other steps that are commonly performed in medical packaging scenarios.

After all components of the dock assembly 200 and/or the DDS 300 are properly introduced into the packaging 100 in their respective desired locations and orientations, the packaging 100 may be closed. The closing step may include engaging the lid 108 with the base 104 such that the opening 115 between the base 104 and the lid 108 is closed and the interior space 112 is fully enclosed between the base 104 and the lid 108. The packaging 100 can then be sterilized via one or more acceptable sterilization methods suitable for medical device, such as exposure to ethylene oxide gas or gamma radiation. It will be appreciated that other suitable methods of sterilization may be utilized.

The dock assembly 200 and/or DDS 300 may be stored within the closed and sterilized packaging 100 until they are needed for implementation. Medical use of the dock assembly 200 and the DDS 300 may be conducted under standard medical and surgical conditions under best practices as understood at the time of use. Although various methods of unpackaging and preparing the dock assembly 200 and/or the DDS 300 from the packaging 100 may be utilized, some exemplary processes are described herein. It will be appreciated that deviations from these methods can be made based on intended use, medical conditions, or other aspects that can affect use of the components.

Figure 18:
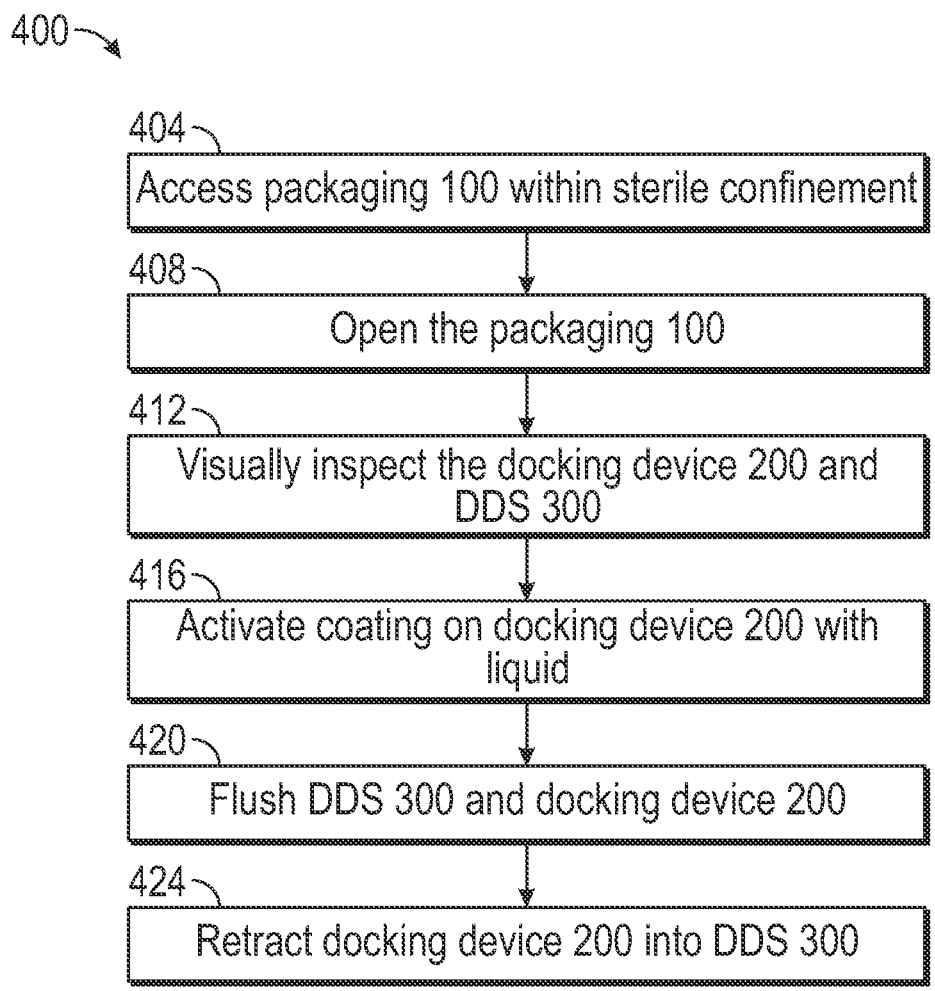
FIG. 18 illustrates a flow chart showing a method of using a packaging according to an aspect of the disclosure.

Referring to FIG. 18, a flow chart depicts an exemplary non-limiting method or process 400 for unpacking, preparing, and conditioning the dock assembly 200 and the DDS 300. Some steps in the described process 400 can be omitted or repeated as necessary during operation. Furthermore, additional steps may be performed before, during, or after the process 400, and this disclosure is not intended to limit the process 400 to just the steps described. Further, the process 400 can be implemented with another dock assembly and/or DDS that may be similar to the dock assembly 200 and/or DDS 300.

Figure 19:
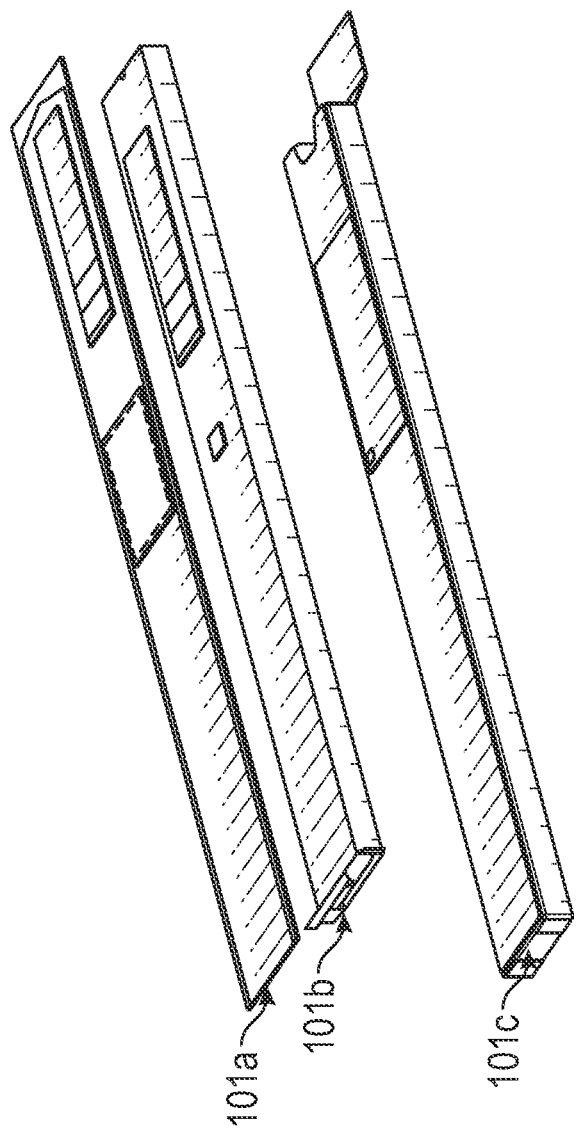
FIG. 19 illustrates a perspective view of a sleeve, a first box, and a second box according to an aspect of the disclosure.

First, at 404, the packaging 100 is retrieved and accessed from storage. The packaging 100 (with the dock assembly 200 and/or the DDS 300 therein) is in the closed configuration and is sterile. The packaging 100 may be secured in an external enclosure. In some aspects, the packaging 100 may be retained within a sleeve 101*a* (see FIG. 19). For example, the sleeve 101*a* may comprise a bag or pouch. In some aspects, the packaging 100 may be further retained within a first box 101*b* and, optionally, within a second box 101*c* (FIG. 19). The sleeve 101*a*, and boxes 101*b*, 101*c* may have various levels of sterility. For example, the sleeve 101*a* may be sealable such that the interior of the sleeve 101*a* is sterile. This allows for the entire packaging 100 to be sterile as well, where both the interior and exterior of the packaging 100 are both sterilized and remain sterile while within the sleeve 101*a*. In some aspects, when the sleeve 101*a* is sealed and sterilized, it is moved into a non-sterile environment, such that the exterior surface of the sleeve 101*a* is no longer sterile, while the sealed interior (which includes the packaging 100) remains sterile. The sleeve 101*a* can then be further packed into external containers, such as the first box 101*b*. The first box 101*b* may not be sterile. In some aspects, the packaging 100 may be stored or transported while in the first box 101*b*. Alternatively, the first box 101*b* may be further packed into another external container, such as the second box 101*c*. The second box 101*c* may also not be sterile and can serve as additional protection against damage during storage and/or shipment. So, at 404, a user can access the packaging 100 from within one or more of the sleeve 101*a*, first box 101*b*, second box 101*c*, or another container. In some aspects, the sleeve 101*a*, which is sterile inside, may be removed from any external containers and placed into a sterile environment, such that when the sleeve 101*a* is opened and the packaging 100 is removed therefrom, the entire packaging 100 remains sterile. The sleeve 101*a*, boxes 101*b* and 101*c*, and any other external containers may be disposed of after the packaging 100 has been removed.

In the method at 408, the user can open the packaging 100. The packaging 100 is moved from the closed configuration, where the interior space 112 is sealed from the outside environment by the base 104 and the lid 108, into the open configuration, where the user can access the interior space 112 through the opening 115 defined between the base 104 and the lid 108 (FIGS. 1 and 2). The lid 108 may be moved away from the base 104. In aspects where the lid 108 is separate from the base 104, the lid 108 may be entirely removed and spaced away from the base 104. In aspects where the lid 108 and the base 104 are hingedly attached to each other, the lid 108 may be rotated or pivoted, along the hinged attachment, away from the base 104.

In the method at 412, the packaging 100 and its components can be inspected by the user. Inspection can reveal any damage to the dock assembly 200 and/or DDS 300. In some aspects, the user can also verify the correct item identification number. In some particular aspects, the user may ensure that the suture lock assembly 320 is not damaged and is properly oriented within the packaging 100. If the DDS 300 is damaged while in the packaging 100, the suture lock assembly 320 may be broken, and it can be advantageous to determine if any components are damaged prior to proceeding. The user may also ensure that the DDS 300 is fully unflexed.

In some aspects, the dock assembly 200 includes a coating thereon to facilitate insertion into the patient and implementation at the target site. The dock assembly 200 may include a coating, lubricious coating, and/or hydrophilic coating, such as a hydrogel, thereon (for example on a sleeve 220 of the dock assembly 200). In some examples, the dock 230 of the dock assembly 200 may have a coating. During transportation or storage, the environment may change over time, such as with different weather patterns, and/or geographic locations. These environment changes can include changes in humidity. Some hydrophilic coatings may absorb moisture in the environment. As delivery devices are transported or stored, the hydrophilic coatings may go through one or more wet-dry cycles. Due to the wet-dry cycles, the hydrophilic coatings on adjacent coils of the dock assembly 200 may stick together. Other coatings may also be prone to sticking together on adjacent coils. Coils of the dock assembly 200 sticking together can be problematic when preparing or loading the dock assembly 200 into the DDS 300 for use. To improve use of the dock assembly 200 and ensure safe movement into the patient, the dock assembly 200 may be treated prior to being introduced into the patient to alleviate any undesired changes to the coatings thereon. Treatment can include activating the coating on the dock assembly 200. At 416, the coating can be activated by introducing a liquid to the dock assembly 200. The liquid may include saline, for example, heparinized saline, but it will be appreciated that other suitable biocompatible liquids may be utilized. In some aspects, the saline may be sprayed onto the dock assembly 200. In some aspects, the dock assembly 200 may be submerged into the saline.

Figure 20A:
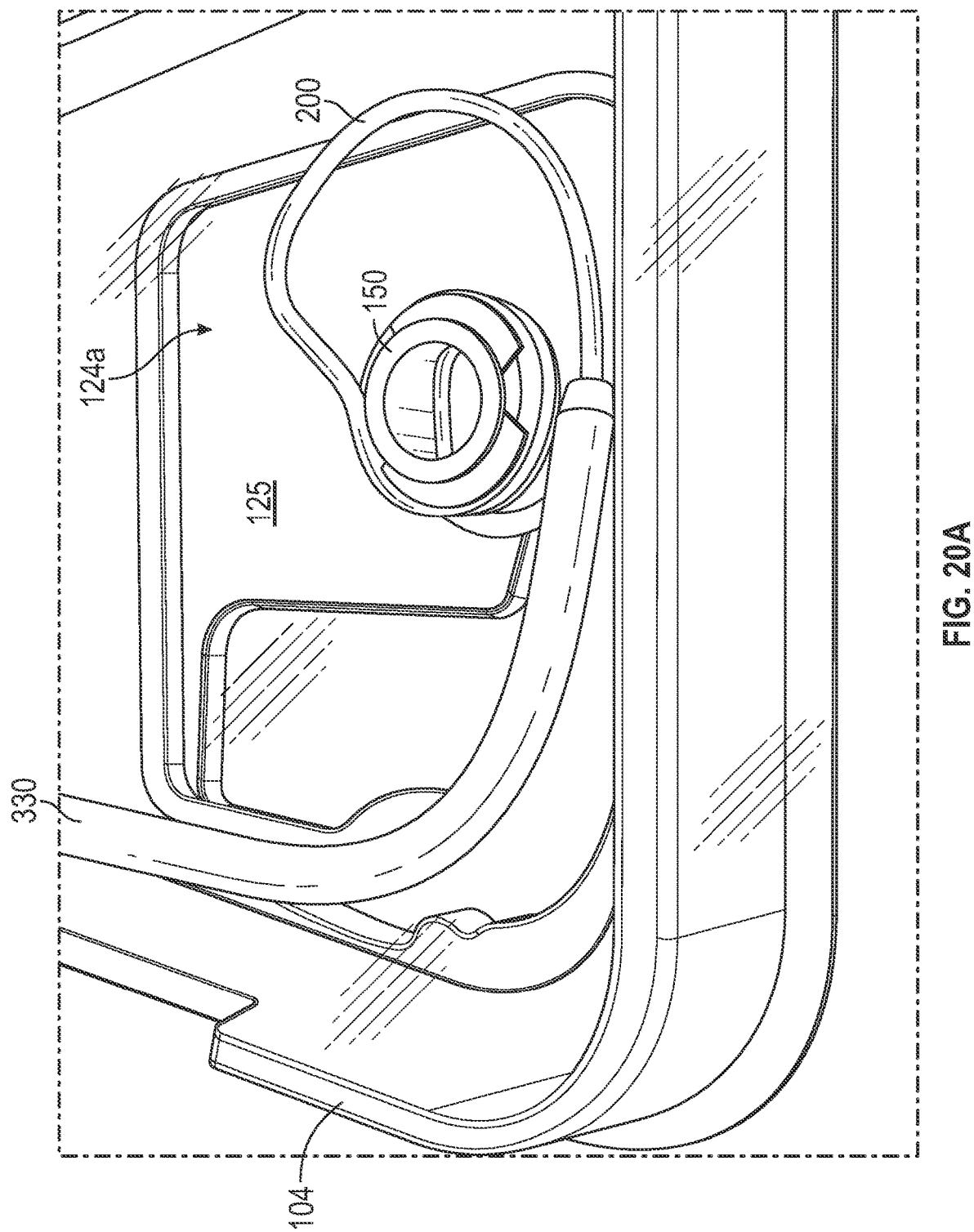
FIG. 20A illustrates a perspective view of a packaging, DDS, and dock assembly with a liquid in the packaging according to an aspect of the disclosure.
Figure 20B:
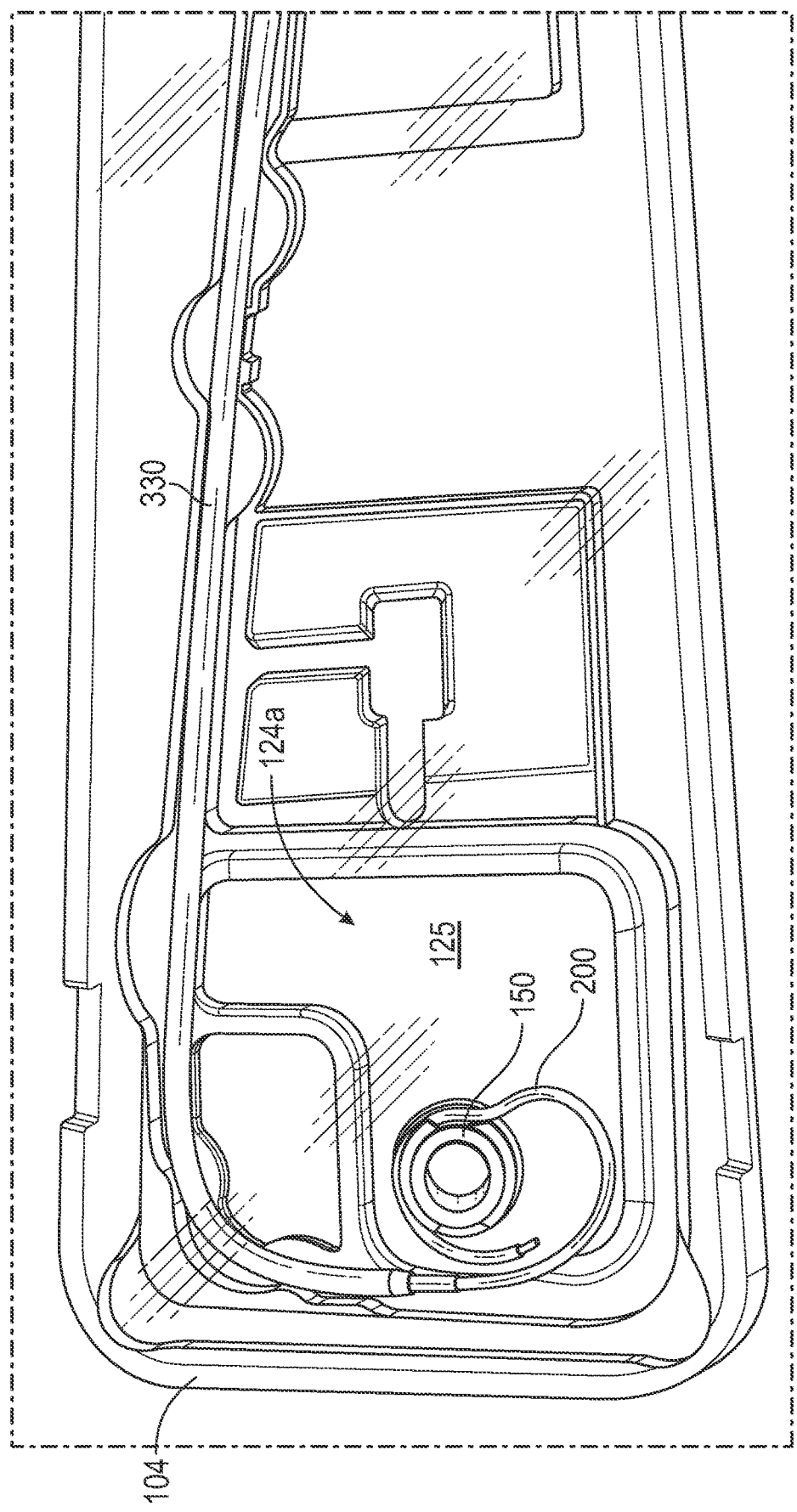
FIG. 20B illustrates a top plan view of the packaging, DDS, and dock assembly of FIG. 20A.
Figure 20C:
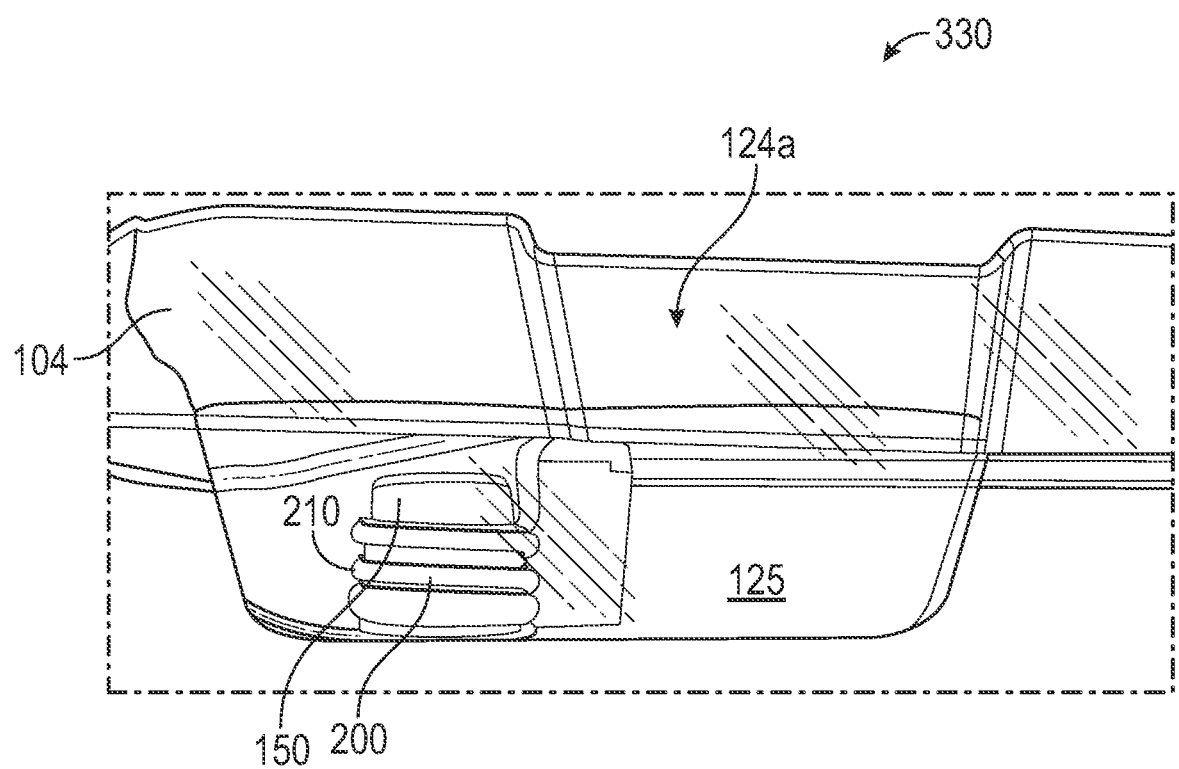
FIG. 20C illustrates a side elevation view of the packaging, DDS, and dock assembly of FIG. 20A.

Referring to FIGS. 20A-20C, saline 125 can be introduced into the dock receptacle 124a of the packaging 100. The amount of saline 125 should be sufficient to cover the desired portion of the dock assembly 200, for example, the entire dock assembly 200 or the coils 210 of the dock assembly 200. The dock receptacle 124a can be sufficiently sized to allow for the necessary amount of the saline 125 to be received therein without causing the saline 125 to overflow outside of the dock receptacle 124a into other portions of the packaging 100. The saline 125 can be introduced into the dock receptacle 124a while the dock assembly 200 is still retained within the dock receptacle 124a, for example on the dock holder 150. The dock assembly 200 may be kept in the saline 125 for a predetermined time. Contacting the dock assembly 200 with the saline 125 can activate the coating on the dock assembly 200 and decrease friction between the dock assembly 200 and the patient upon insertion into the patient. The saline 125 may further serve to de-gas the dock assembly 200 by displacing air in contact with the dock assembly 200. This de-gassing helps decrease chances of air bubbles being introduced into the patient when the dock assembly 200 is inserted into the patient.

Returning to FIG. 18, at 420 of the process 400, the DDS 300 and the dock assembly 200 may be flushed with liquid, for example, heparinized saline. The saline can be introduced into one or more of the flushing ports 334 and/or into other flushing ports on the DDS 300. It will be understood that any caps, nuts, or retainers can be loosened, unscrewed, or opened to allow the saline to be moved through the DDS 300. This flushing helps de-gas the DDS 300 to remove air therefrom and prevent formation of air bubbles when the DDS 300 is used to introduce the dock assembly 200 into the patient. The user may ensure that the flushing is working properly by observing whether the saline is flowing from where the saline is introduced at one or more of the flushing ports 334 towards and out of an opposite end of the DDS 300, for example, where the DDS 300 receives the dock assembly 200 or a distal end of the DDS 300. In some aspects, the flushing at 420 may be performed prior to the activating at 416 of process 400. In such aspects, the saline that is used to flush the DDS 300 may be collected in the dock receptacle 124a as it exits the DDS 300 adjacent the dock assembly 200. This way, the same saline 125 used to flush the DDS 300 may then be used to de-gas and activate the dock assembly 200 as described with reference to step 416.

After the inspection, de-gassing, and flushing steps, in aspects where the dock assembly 200 is connected to and/or at least partially arranged within the DDS 300, the dock assembly 200 can be retracted into the DDS 300 at 424. The DDS 300 can be actuated to cause at least a portion of the dock assembly 200 to move into the DDS 300, for example into the shaft 330. During this movement, the dock assembly 200 can slide relative to the dock holder 150 and slide off the dock holder 150. This step can be initiated while the dock assembly 200 is still submerged in the saline 125 in the dock receptacle 124a. In some aspects, the dock assembly 200 may be moved into the DDS 300 until a predetermined portion of the dock assembly 200 remains outside of the DDS 300, for example, a portion representing a quarter turn of the dock assembly 200, specifically for example a quarter turn of the coiled first portion 208 of the dock assembly 200.

Figure 21A:
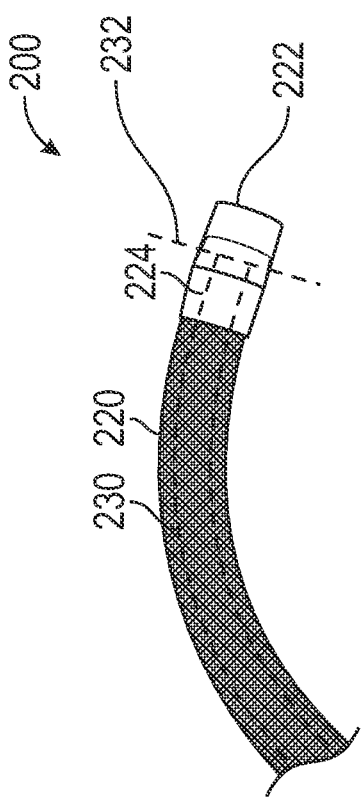
FIG. 21A illustrates a dock assembly showing a sleeve and a dock relative to the sleeve in a first position.
Figure 21B:
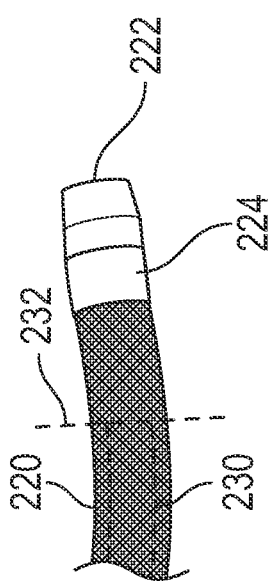
FIG. 21B illustrates the dock assembly of FIG. 21A showing the sleeve and the dock relative to the sleeve in a second position.
Figure 21C:
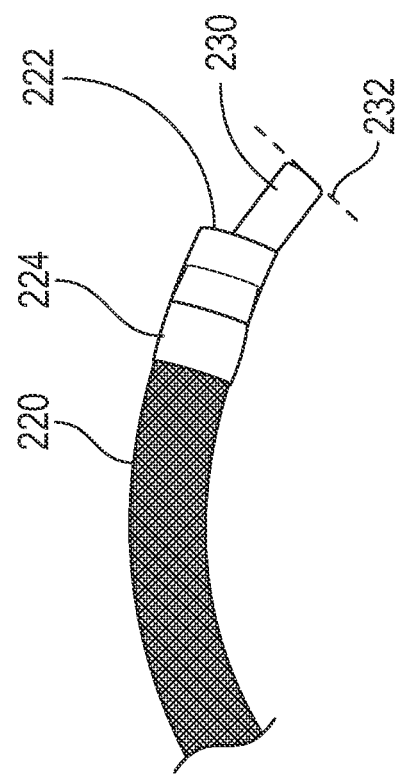
FIG. 21C illustrates the dock assembly of FIG. 21A showing the sleeve and the dock relative to the sleeve in a third position.

Additional steps may be performed after 420 of process 400, such as further inspection of the DDS 300 and/or the dock assembly 200. For example, the user may visually observe the dock assembly 200 to ensure components of the dock assembly 200 are properly aligned. Referring to FIGS. 21A-21C, an exemplary dock assembly 200 is shown with the sleeve 220 and the dock 230 in different positions relative to one another (see FIG. 17B for reference). The sleeve 220 includes the distal end 222 and the marker band 224. The dock 230 includes the distal end 232. If, after 420 in process 400, the distal end 232 of the dock 230 is positioned distal to the distal end 222 of the sleeve 220 (as shown in FIG. 21C), then the sleeve 220 should be moved in the distal direction (away from the DDS 300) such that the distal end 222 of the sleeve 220 covers the distal end 232 of the dock 230 (FIG. 21A). If the distal end 232 of the dock 230 is positioned proximal to the marker band 224 (i.e., the distal end 232 of the dock 230 is between the marker band 224 and the DDS 300, as shown in FIG. 21B), the sleeve 220 should be moved in a proximal direction opposite the distal direction (toward the DDS 300) until the marker band 224 is between the distal end 232 of the dock 230 and the DDS 300 (FIG. 21A). It may be advantageous to ensure that the distal end 232 of the dock 230 is disposed between the marker band 224 and the distal end 222 of the sleeve 220 (FIG. 21A). In FIGS. 21A-21C, a dotted line is included for reference to show where the distal end 232 of the dock 230 is relative to the distal end 222 of the sleeve 220.

The process 400 described above with reference to FIG. 18 offers various advantages over existing techniques. By providing a dock receptacle 124a in which the dock assembly 200 can be conditioned prior to use allows the user to retain the dock assembly 200 within the packaging 100 until the time the dock assembly 200 is ready for use. This eliminates the otherwise-necessary steps of removing the dock assembly 200 from the packaging 100, acquiring a suitable container or tray, placing the dock assembly 200 into the container or tray, and then conditioning it. By providing the dock receptacle 124a, the user can perform the necessary conditioning within the packaging 100 itself. This decreases chances of damaging the dock assembly 200 during undesired movement out of the packaging 100. Furthermore, the dock assembly 200 can be retained on the dock holder 150 during the conditioning process, which allows the dock assembly 200 to be oriented in the desired position and the various coiled portions of the dock assembly 200 can be separated by the threads 182 of the dock holder 150. This allows the saline 125 to better surround, penetrate, and coat the dock assembly 200 than if the dock assembly 200 were removed from the dock holder 150 prior to being subject to the de-gassing and flushing steps. By providing the dock receptacle 124a within the packaging 100, the need for external tools and trays is eliminated, increasing workspace in the designated sterile environment (or alternative decreasing the necessary space that would otherwise be required for a sterile environment).

Figure 22:
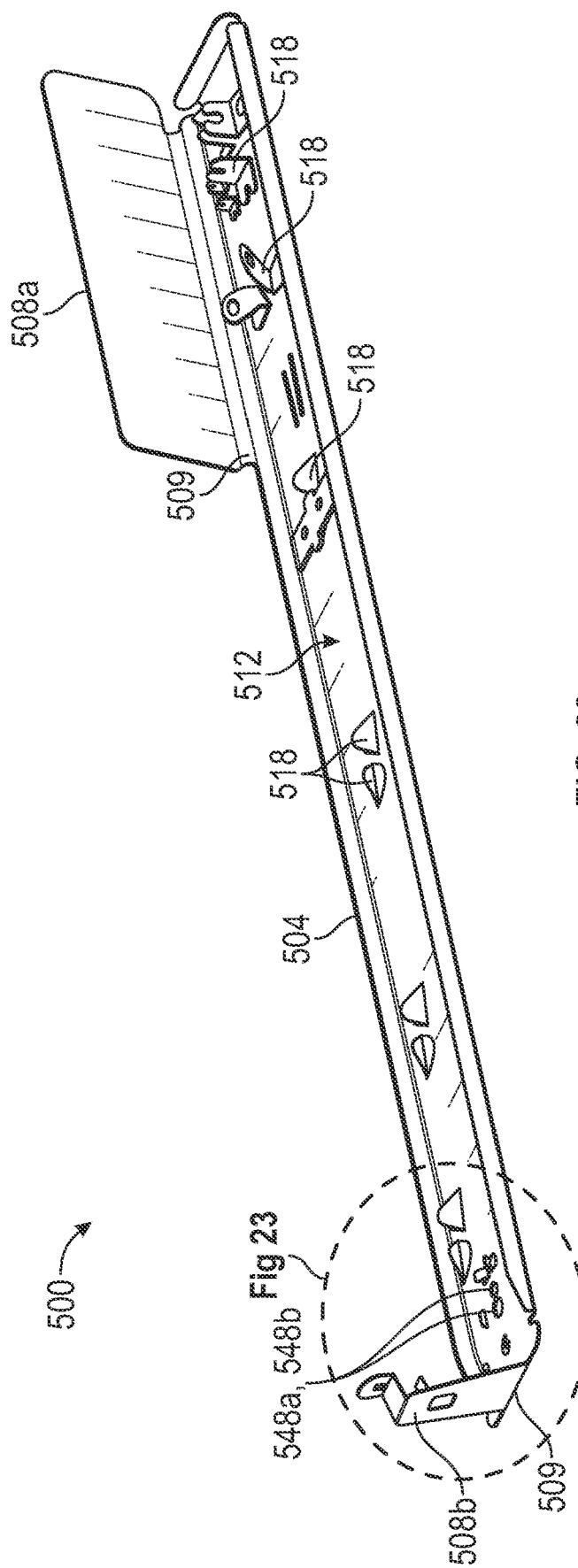
FIG. 22 illustrates a perspective view of a packaging according to another aspect of the disclosure.

Also disclosed herein are alternative packaging concepts that can be utilized with a DDS 300 and/or a dock assembly 200 (or a similar DDS and dock assembly) as described above. Referring to FIGS. 22-24, a packaging 500 is depicted having a base 504 configured to receive one or both of the DDS 300 and the dock assembly 200. Packaging 500 may comprise high-density polyethylene (HDPE) or another suitable polymer. The base 504 is configured such that the dock assembly 200 and/or the DDS 300 can be releasably secured to the base 504 in a desired position and orientation to prevent damage to components and allow safe sterilization, packaging, storage, transportation, and preparation prior to use. The packaging 500 may offer some or all of the advantages described above with respect to the packaging 100.

The base 504 defines a base surface 512 configured to receive the dock assembly 200 and/or the DDS 300 thereon. One or more lids 508 may be configured to releasably contact a portion of the base 504. In some aspects, the one or more lids 508 may be hingedly attached to the base 504, such that the one or more lids 508 are configured to rotate along a hinge 509 towards and away from the base 504. In some aspects, the packaging 500 may include a plurality of lids 508, where each of the plurality of lids 508 is separately configured to be moved towards or away from the base 504. The lid 508 may define one or more attachment members 510 configured to releasably secure the one or more lids 508 to the base 504 (FIGS. 23 and 24). FIGS. 22-23 depict one example where the packaging 500 includes a first lid 508*a* and a second lid 508*b*, the second lid 508*b* including the attachment member 510.

A plurality of retention features 518 (or retention members) are disposed on the base surface 512 and are configured to releasably engage the dock assembly 200 and/or the DDS 300. The retention features 518 may include a material that is deformable, flexible, or otherwise malleable, such that the retention features 518 can be deflected in a desired direction relative to the base 504 to engage with respective components of the dock assembly 200 and the DDS 300. The retention features 518 may include straps, tabs, notches, protrusions, or other retention mechanisms. In some aspects, the retention features 518 are cutouts defined on the base 504 that are configured to be deflected away from the base 504. When the retention features 518 are deflected away from the base 504, one or more components can be received between the retention features 518 and the base surface 512, between the retention features 518 and the one or more lids 508, between the retention features 518 and another component, or between separate retention features 518.

In some aspects, additional retention features may be introduced to the base 504 that are separate from the base 504. For example, a first strap 520*a* can be introduced to the base 504 (FIG. 24). The first strap 520*a* can be secured to the base 504 to one or more notches 520*b* defined on the base surface 512. In some aspects, additional straps, such as a second strap 521*a* may be introduced to the base 504 and secured with respective notches 521*b* defined on the base 504 (FIG. 24). The first exemplary strap 520*a* is depicted alone in FIG. 27A, the second exemplary strap 521*a* is depicted alone with in FIG. 27B, and a third exemplary strap 522*a* is depicted alone in FIG. 27C (an in some examples can be included on the base 504 in place of or in addition to the straps shown in FIG. 24).

The first, second, and/or third straps 520*a*, 521*a*, and 522*a* can be removably engaged with the base 504 to further secure portions of the dock assembly 200 and/or the DDS 300. In some aspects, the first strap 520*a* can be used to secure the handle 304 of the DDS 300 to the base 504. In some aspects, the second strap 521*a* may be used to secure another portion of the DDS 300 that extends from the handle 304. In some aspects, the third strap 522*a* may be used to secure one or more tubular components (e.g. various flushing ports 334) to the base 504. Although the first, second, and third exemplary straps 520*a*, 521*a*, and 522*a* are depicted as separate components from the base 504, it should be understood that the packaging 500 may be formed such that the straps are unitary pieces with the base 504.

In some aspects, a dock holder, such as a first dock holder 550*a* (FIGS. 25A and 25B) and/or a second dock holder 550*b* (FIGS. 26A and 26B), can receive the dock assembly 200 or at least a portion of the dock assembly 200 thereon in the packaging 500. The dock holders 550*a, b* may be separate components from the base 504 that are configured to be received on and secured to the base 504. The base 504 may include one or more dock holder receptacles 548*a*, 548*b* configured to receive the dock holder 550 therein (FIGS. 22-24).

Referring to FIGS. 25A-26B, the dock holders 550*a* and/or 550*b* may be substantially cylindrical and configured to receive a portion of the dock assembly 200 thereon. The dock holders 550*a* and/or 550*b* each can include a body 554 having a proximal end 558 and a distal end 562 opposite the proximal end 558. A central axis B extends between the proximal end 558 and the distal end 562. The body 554 may be substantially cylindrical, but it will be appreciated that other shapes can be utilized and will depend on the dock assembly 200 that the dock holder 550*a* and/or 550*b* will be designed to receive and retain. The body 554 has an exterior surface 566 and an interior surface 570 opposite the exterior surface 566 and spaced from the exterior surface 566 along a radial direction toward the central axis B. The interior surface 570 defines a bore 574 extending through the body 554. The bore 574 may be a through bore that extends along the entirety of the body 554 and opens at both the proximal end 558 and the distal end 562. Alternatively, the bore 574 may be a blind bore that extends along a portion of the body 554 and opens at the proximal end 558 but does not open at the distal end 562.

In some aspects, the packaging 500 may include two dock holders 550*a* and 550*b* configured to both contact the dock assembly 200. In some aspects, the first dock holder 550*a* may be configured to be disposed on the base 504 at a first dock holder receptacle 548*a*, and the second dock holder 550*b* may separately be configured to be disposed on the base 504 at a second dock holder receptacle 548*b* that is spaced from the first dock holder receptacle 548*a* (FIG. 23, the first and second dock holders 550*a*, 550*b* shown in phantom by dashed lines). The first dock holder 550*a* may be adjacent to the second dock holder 550*b*.

Figure 26A:
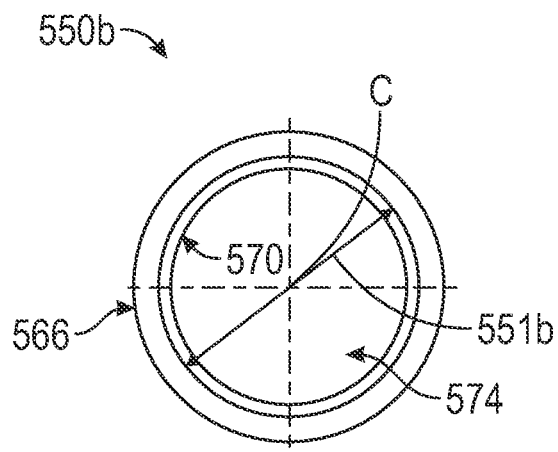
FIG. 26A illustrates a top plan view of a dock holder according to another aspect of the disclosure.
Figure 26B:
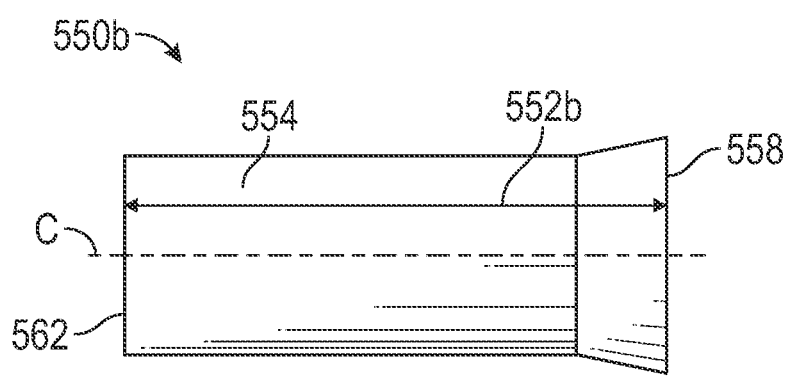
FIG. 26B illustrates a side elevation view of the dock holder of FIG. 26A.
Figure 27A:
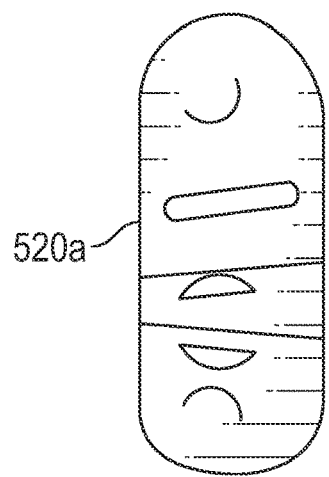
FIG. 27A illustrates a top plan view of a separate retention member for use with a packaging according to an aspect of the disclosure.
Figure 27B:
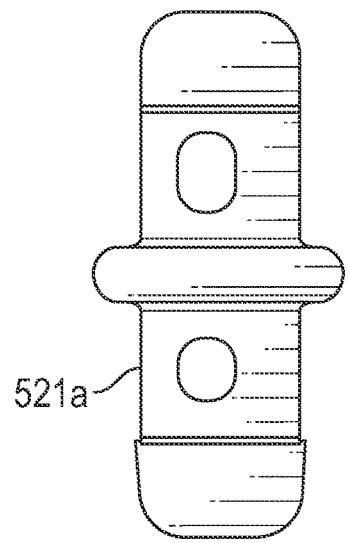
FIG. 27B illustrates a top plan view of another separate retention member for use with a packaging according to an aspect of the disclosure.
Figure 27C:
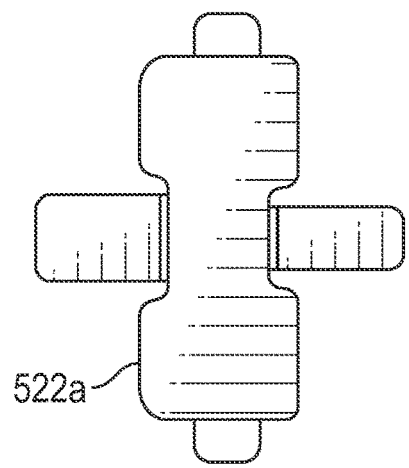
FIG. 27C illustrates a top plan view of yet another separate retention member for use with a packaging according to an aspect of the disclosure.
Figure 29A:
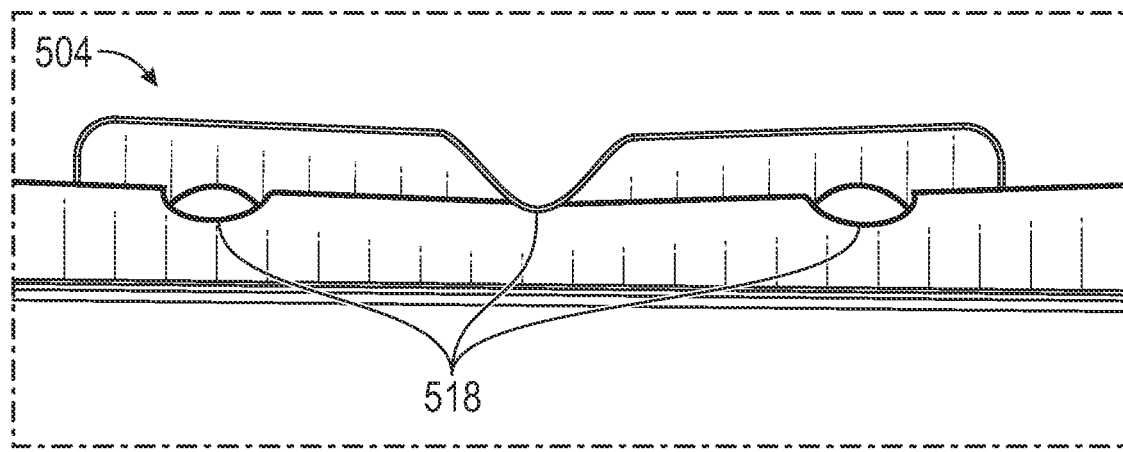
FIG. 29A illustrates a top plan view of a portion of a packaging according to yet another aspect of the disclosure showing a plurality of retention members thereon.
Figure 29B:
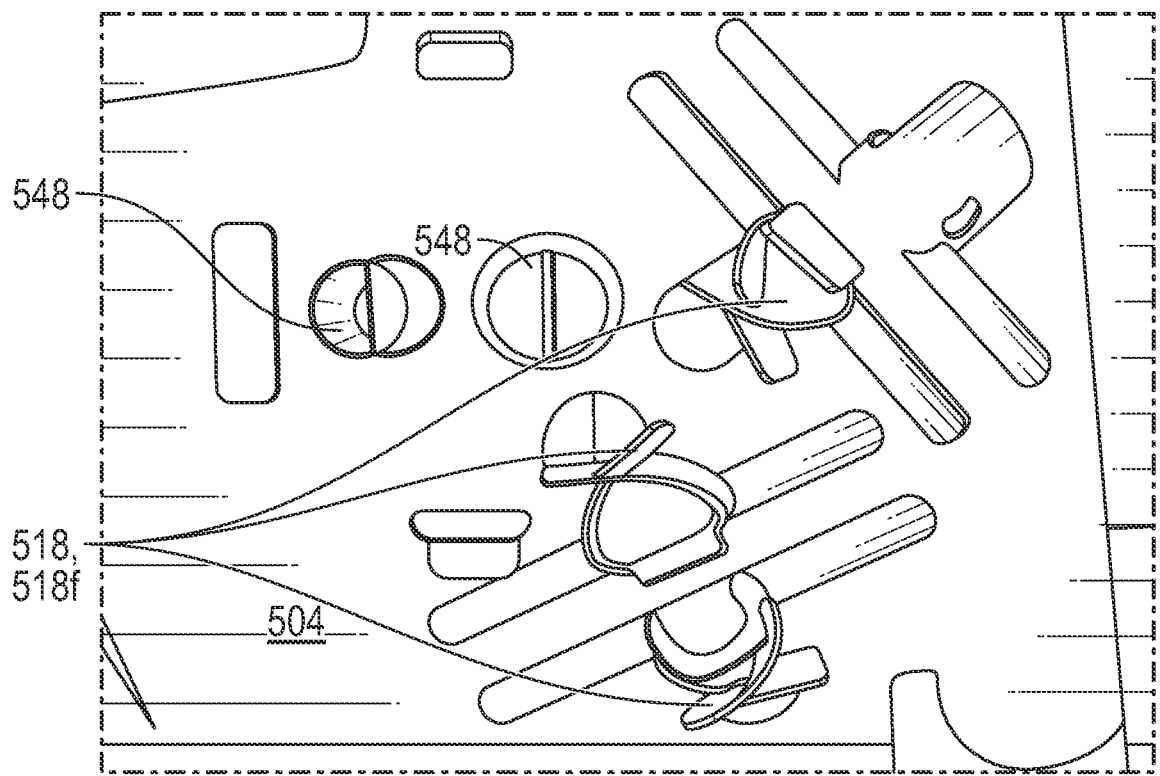
FIG. 29B illustrates a perspective view of another portion of the packaging of FIG. 29A showing another plurality of retention members thereon.
Figure 29C:
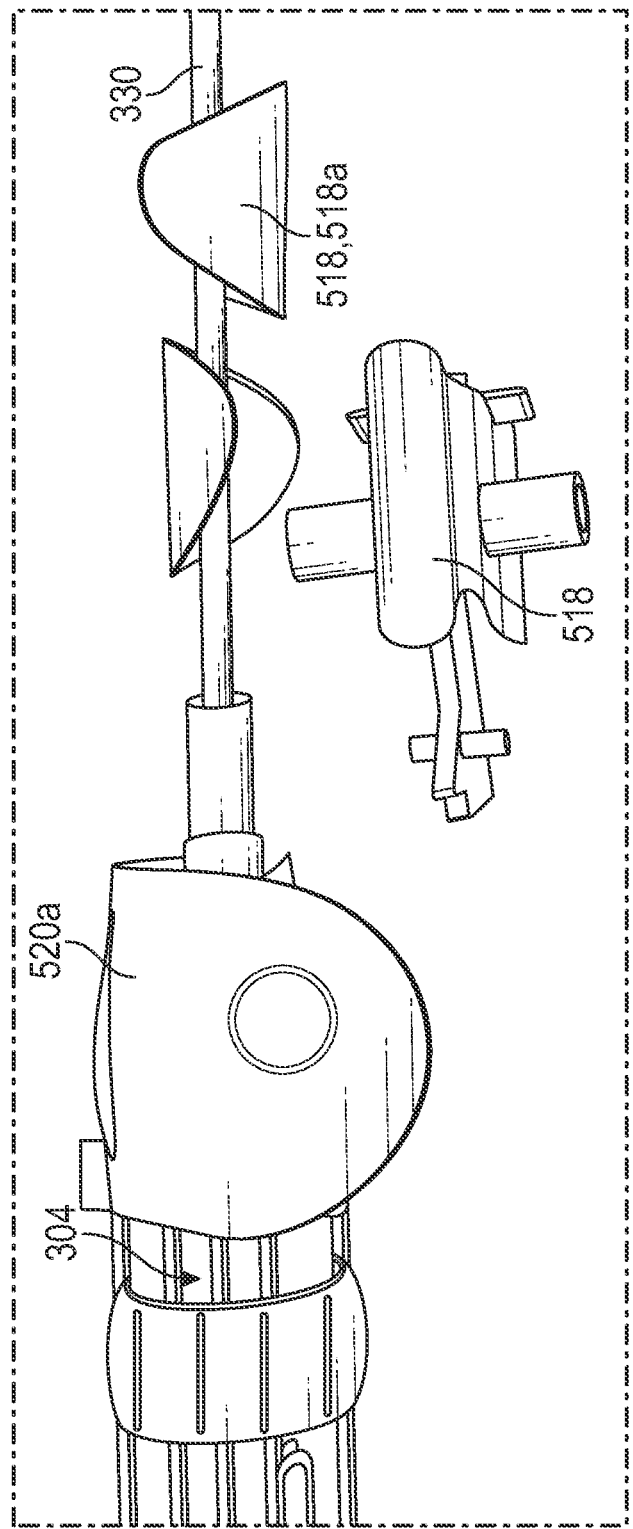
FIG. 29C illustrates a perspective view of another portion of the packaging of FIG. 29A showing another plurality of retention members thereon.
Figure 29D:
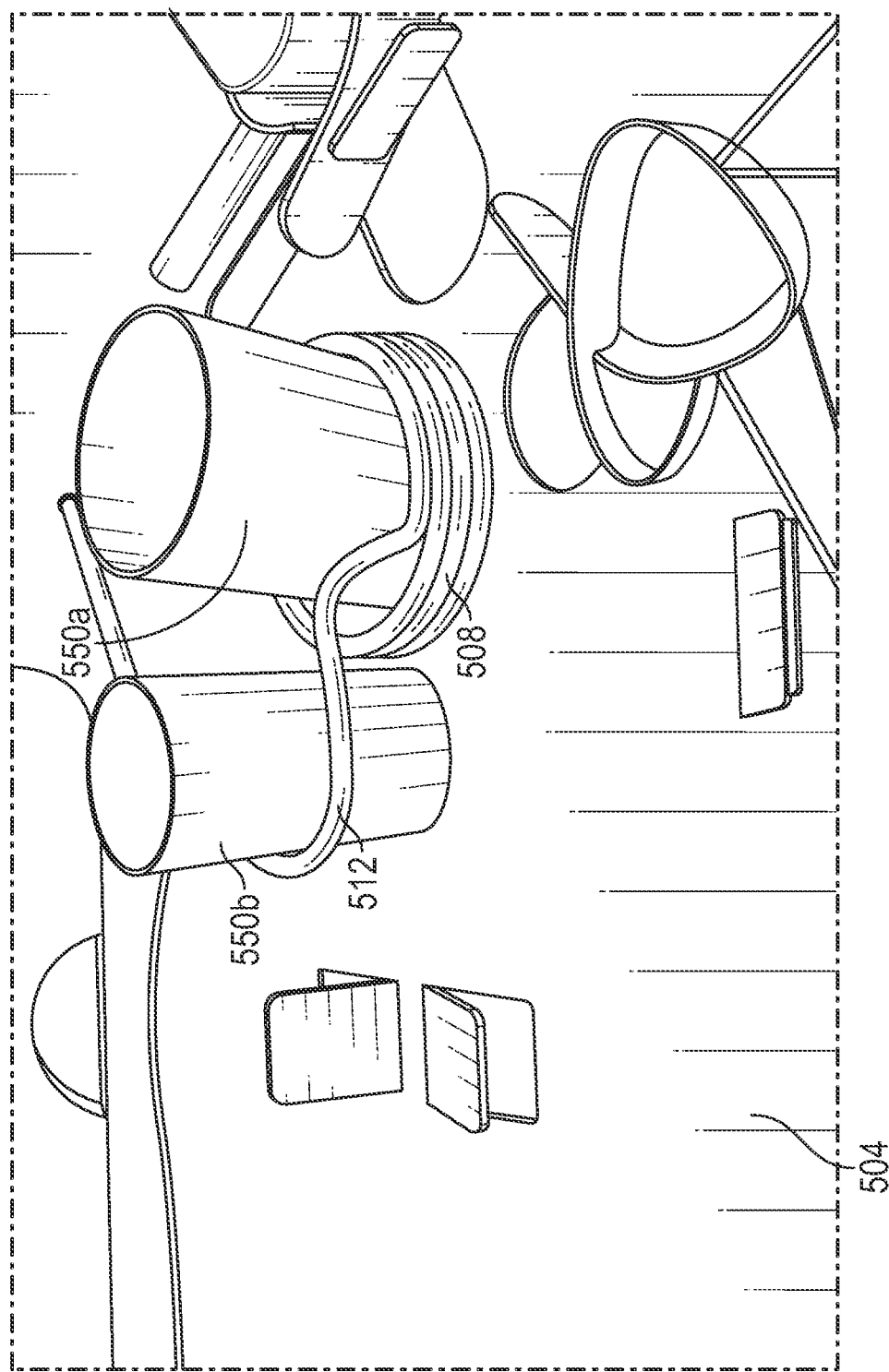
FIG. 29D illustrates a perspective view of another portion of the packaging of FIG. 29A showing another plurality of retention members thereon.

The first dock holder 550*a* may be configured to receive thereon the first portion 208 of the dock assembly 200, while the second dock holder 550*b* may be configured to receive the second portion 212 of the dock assembly 200 (FIG. 29D). The combination of the first and second dock holders 550*a* and 550*b* provides additional support for the different portions of the dock assembly 200. The second dock holder 550*b* may have features similar to the first dock holder 550*a* but being defined relative to a central axis C (FIGS. 26A and 26B). Central axis C may be parallel to and spaced from the central axis B. In some aspects, the central axis C may be spaced from and non-parallel to the central axis B. The second dock holder 550b may include the same other features of the first dock holder 550a unless indicated otherwise.

Figure 25A:
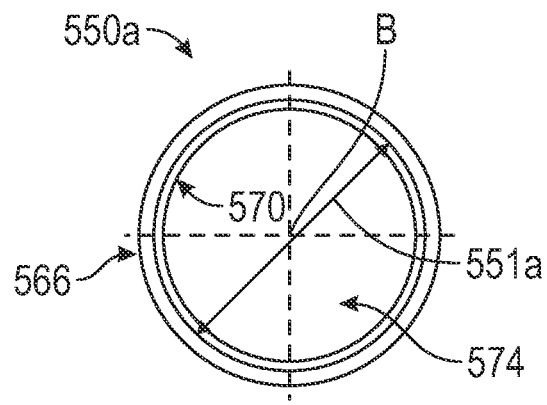
FIG. 25A illustrates a top plan view of a dock holder according to another aspect of the disclosure.

The first and second deck holders 550a and 550b may have the same shapes and dimensions or may, alternatively, have different shapes and/or dimensions. Each of the first and second dock holders 550a and 550b may be substantially cylindrical and may have a cross-sectional diameter 551a and 551b, respectively (measured perpendicular to the central axis B and central axis C, respectively, as shown in FIGS. 25A and 26A). In some aspects, the diameters 551a and 551b may be between about 0.1 inch (0.25 cm) and about 3 inch (7.62 cm), between about 0.2 inch (0.51 cm) and about 2 inch (5.08 cm), between about 0.3 inch (0.76 cm) and about 1.5 inch (3.81 cm), between about 0.4 inch (1.02 cm) and about 1 inch (2.54 cm), or within a combination of the above ranges. In some aspects, the diameter 551a of the first dock holder 550a may be greater than the diameter 551b of the second dock holder 550b, or vice versa. In some aspects, the diameters 551a and 551b may be substantially equal. In some particular aspects, for example those shown in FIGS. 25A-25B, the first dock holder 550a may have a diameter 551a of between about 0.7 inch (1.78 cm) to about 0.931 inch (2.365 cm). In the exemplary aspects of FIGS. 26A-26B, the second dock holder 550b may have a diameter 551b of between about 0.5 inch (1.27 cm) and about 0.651 inch (1.654 cm).

Figure 25B:
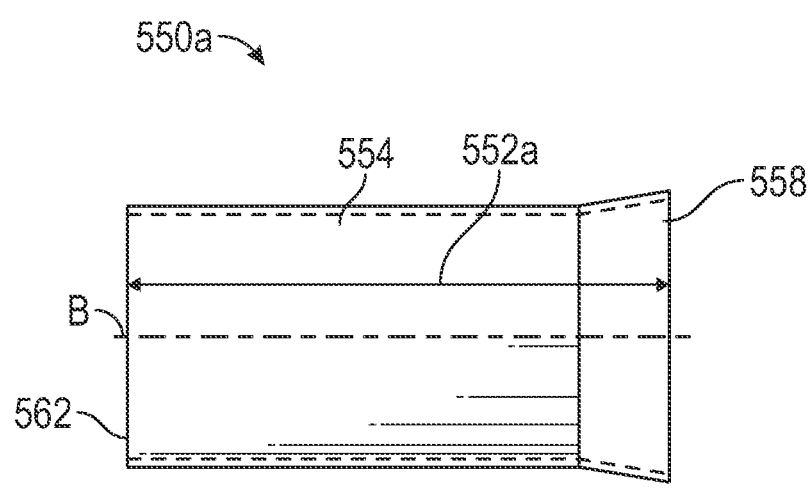
FIG. 25B illustrates a side elevation view of the dock holder of FIG. 25A.

The dock holders 550a and 550b may further define heights 552a and 552b, respectively, measured along the central axis B and central axis C, respectively, between each respective proximal end 558 and distal end 562 (FIGS. 25B and 26B). In some aspects, the height 552a of the first dock holder 550a may be greater than the height 552b of the second dock holder 550b. In some aspects, the height 552a may be less than the height 552b. In some aspects, the heights 552a and 552b may be substantially the same. The heights 552a and 552b may be between about 0.1 inch (0.25 cm) and about 3 inch (7.62 cm), between about 0.2 inch (0.51 cm) and about 2.5 inch (6.35 cm), between about 0.3 inch (0.76 cm) and about 2 inch (5.08 cm), between about 0.4 inch (1.02 cm) and about 1.5 inch (3.81 cm), or within a combination of the above ranges. In the particular exemplary aspects depicted in FIGS. 25A-26B, the heights 552a and 552b may be approximately 1.5 inch (3.81 cm).

In some aspects, the dock holder 150 described above can be utilized with the packaging 500 instead of or in addition to one or more dock holders 550a, 550b. In such aspects, the dock holder receptacle (or post) 548a and/or 548b may be configured to engage with the dock holder 150. In some aspects, the packaging 500 may include a plurality of dock holders, such as a dock holder 150 and a dock holder 550a or 550b.

Figure 29E:
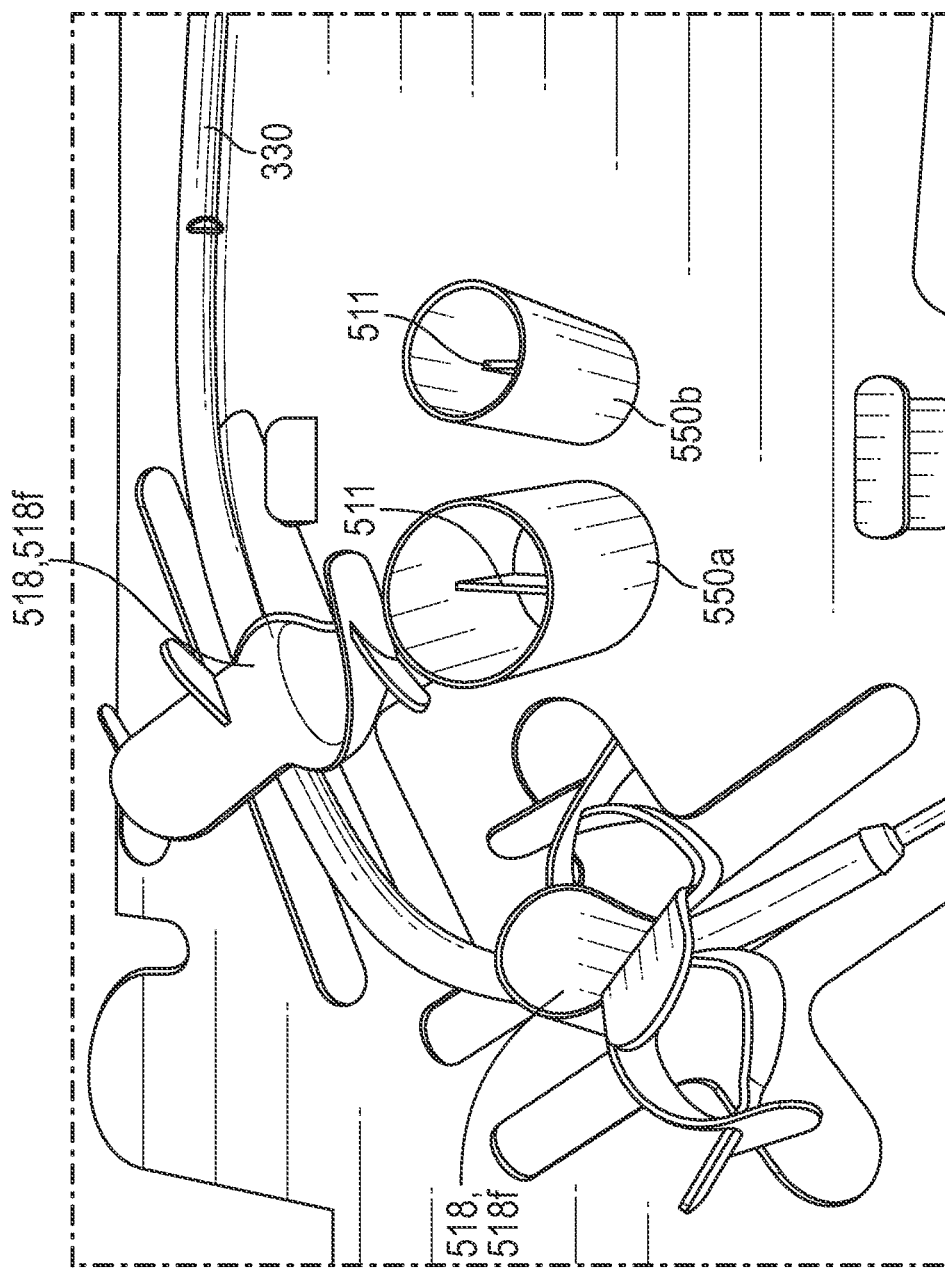
FIG. 29E illustrates a perspective view of another portion of the packaging of FIG. 29A showing another plurality of retention members thereon.
Figure 29F:
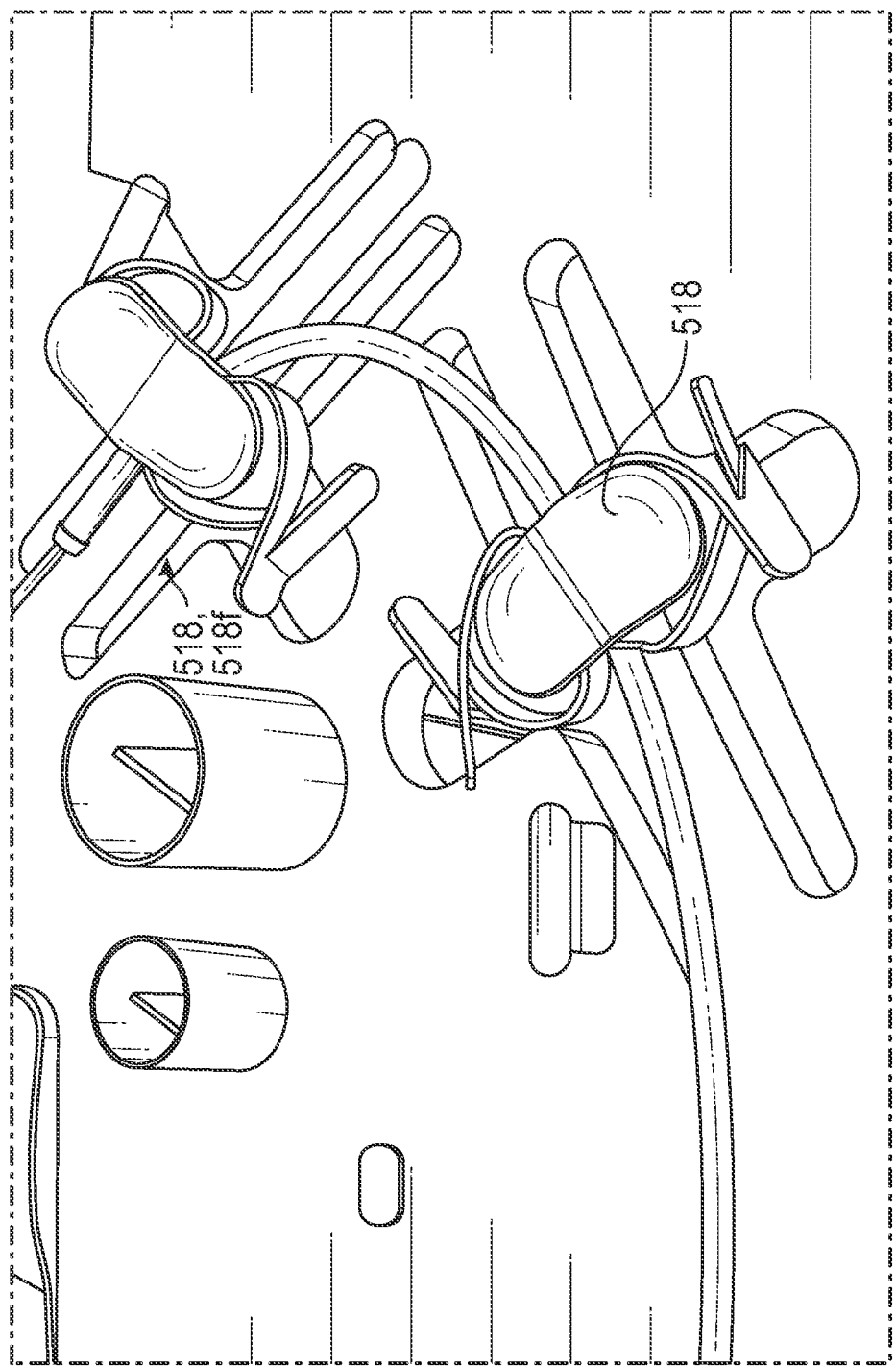
FIG. 29F illustrates a perspective view of another portion of the packaging of FIG. 29A showing another plurality of retention members thereon.

In some aspects, the second lid 508b may releasably attach to the base 504 by engagement between the one or more attachment members 510 defined on the second lid 508b (FIG. 23) and a respective receiving member 511 on the base 504 or on another component within the packaging 500 (FIGS. 29E and 29G). In some aspects, the first and/or second dock holders 550a and/or 550b may include a receiving member 511 thereon (see FIG. 29E) configured to releasably engage with an attachment member 510 (e.g., the attachment member 510 on the second lid 508b, as shown in FIGS. 23-24).

The components of the dock assembly 200 and the DDS 300 may be secured within the packaging 500 by one or more components of the packaging 500. Referring to FIGS. 28 and 29A-29I, various retention features 518 are shown that can be configured to engage with components of the DDS 300 and the dock assembly 200. FIGS. 28 and 29A-29I show non-limiting examples of various retention features 518 that are configured to retain and/or interface with various exemplary components of the DDS 300 and/or dock assembly 200.

Figure 28:
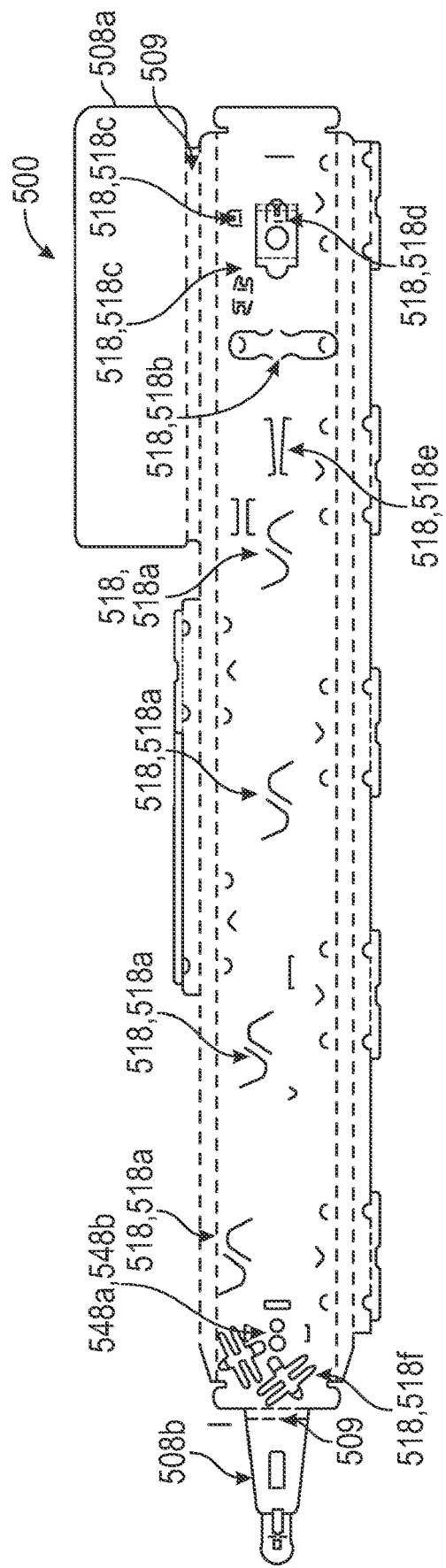
FIG. 28 illustrates a top plan view of a packaging according to an aspect of the disclosure showing a plurality of retention members.
Figure 29H:
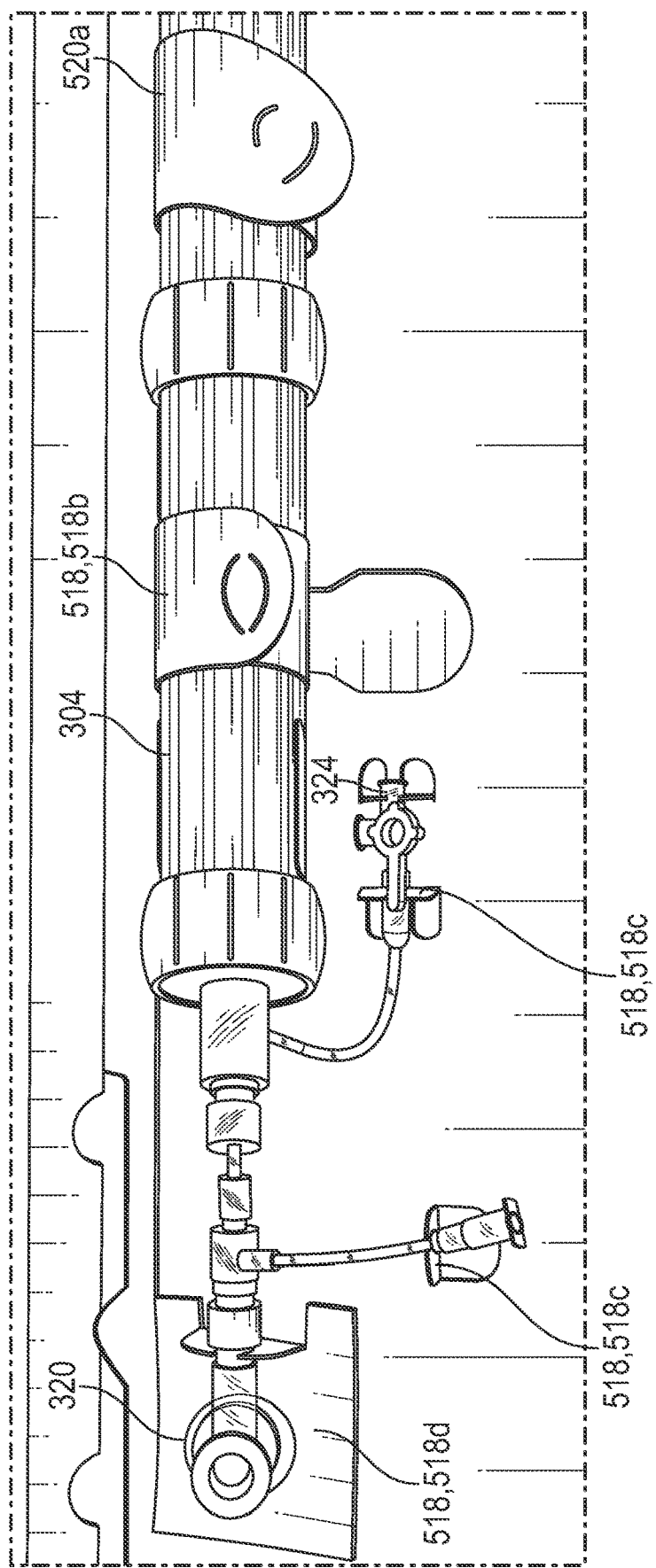
FIG. 29H illustrates a perspective view of another portion of the packaging of FIG. 29A showing another plurality of retention members thereon.

As an example, FIG. 28 shows a plurality of retention features 518a that can be configured to hold and/or retain against the base 504 of the packaging 500 the shaft 330 (or a catheter) of the DDS 300 (as shown in FIG. 29C). In some embodiments, the retention features 518a can be configured as pairs of tabs configured to extend over a portion of the shaft 330 (e.g., catheter shaft holding tabs). FIG. 28 also shows retention features 518b configured as center handle securing tabs that are configured to hold a portion of the handle 304 of the DDS 300 (as shown in FIG. 29H). The packaging 500 can also include a retention features 518c configured as stopcock and/or luer retaining tabs that are configured to hold a stopcock, luer, and/or the connected stopcock tubing of the DDS 300 (as shown in FIGS. 29H and 29I). The packaging 500 can also include a retention feature 518d configured as a pop up tab configured to hold a portion of the suture lock assembly 320 of the DDS 300 (as shown in FIGS. 29H and 29I). Additionally or alternatively, the packaging 500 can include one or more retention features 518e configured as stopper tabs configured to stop or hold another portion of the DDS 300 (FIG. 28). The packaging 500 can also include one or more retention features 518f configured as locking tabs that can lock together to hold a distal portion of the shaft 330 of the DDS 300 that can be configured to receive the dock assembly 200 therein (FIGS. 28, 29B, 29E, and 29F).

Figure 30:
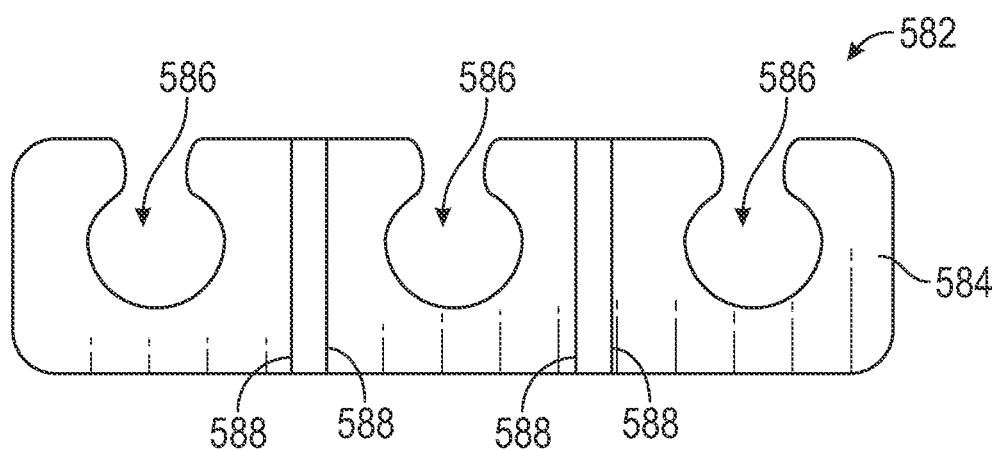
FIG. 30 illustrates a top plan view of a separator in an unfolded configuration according to an aspect of the disclosure.
Figure 31:
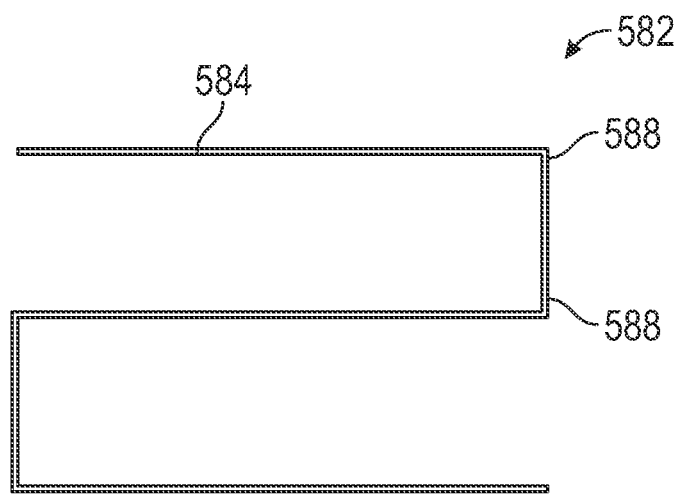
FIG. 31 illustrates a side elevation view of the separator of FIG. 30 in a folded configuration.
Figure 32:
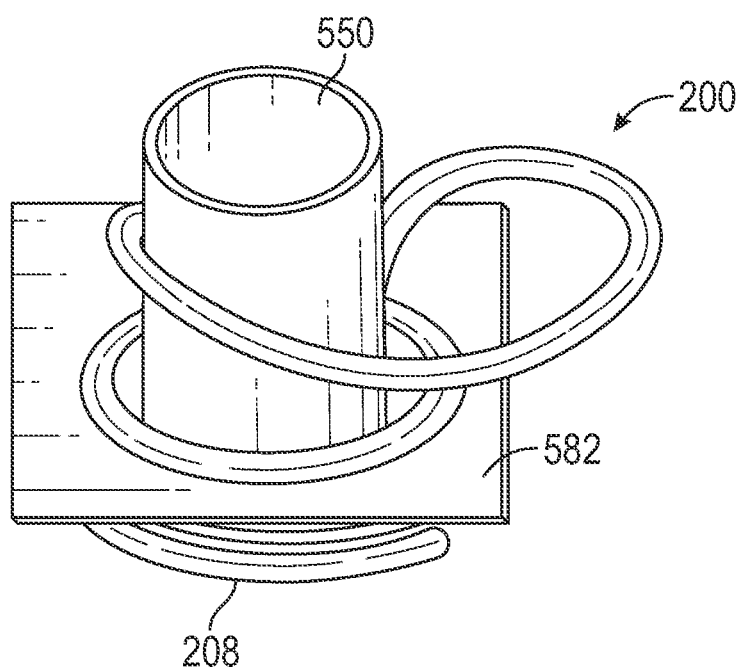
FIG. 32 illustrates a perspective view of a dock holder, dock assembly, and separator engaged together according to an aspect of the disclosure.

As explained above, it may be advantageous to ensure that coils 210 of the dock assembly 200 are kept separate from adjacent portions of the dock assembly 200 (along the axial direction) when the dock assembly 200 is being secured to the dock holder(s) 150 or 550. When the dock assembly 200 is introduced onto the dock holder 550 (for example on the first dock holder 550a), a separator 582 may be disposed on the dock holder 550 and positioned between adjacent coils of the dock assembly 200 (for example the coiled first portion 208) when the dock assembly 200 is disposed on the dock holder 550 (FIG. 32). Referring to FIG. 30, an exemplary separator 582 is shown in a flat unfolded configuration. The separator 582 may include the same material as the rest of the packaging 500, or, alternatively, it may include a different material. The separator 582 is configured to engage the dock holder 550 such that a portion of the separator 582 is disposed between at least two adjacent portions of the dock assembly 200 along the axial direction (FIG. 32). The separator 582 includes a body 584 defining an opening 586 thereon. The opening 586 is configured to receive therein the dock holder 550. The body 584 may be foldable along folds 588. FIG. 30 depicts a top view of the separator in the unfolded configuration. FIG. 31 depicts a side view of the separator in a folded configuration. The body 584 may define a plurality of openings 586. FIG. 32 depicts the dock holder 550 with the dock assembly 200 thereon and the separator 582 disposed on the dock holder 550 such that at least a portion of the separator 582 is between adjacent coils of the first portion 208 of the dock assembly 200.

Figure 33:
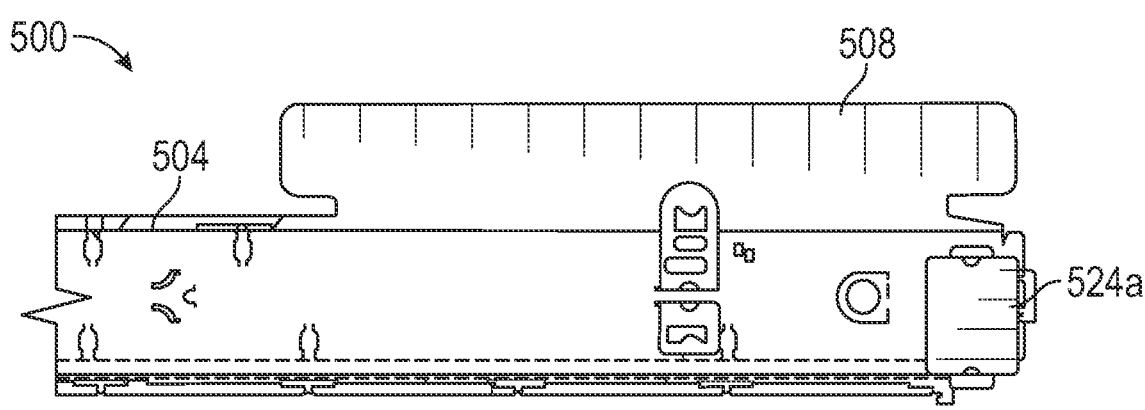
FIG. 33 illustrates a portion of a packaging having a dock receptacle tray according to an aspect of the disclosure.

In some examples, the base 504 may not include a dedicated dock receptacle 124a as described above. In some aspects, and referring to FIG. 33, a separate dock receptacle tray 524a can be introduced into or onto the base 504 to serve substantially the same purpose as the dock receptacle 124a described throughout this application. The dock receptacle tray 524a may include the same material as the rest of the packaging 500, or, alternatively, it can include a different material. The dock receptacle tray 524a may be separate from the packaging 500 and may be configured to be engaged with the packaging 500 by the user. One or more retention features may be disposed on the packaging 500 that are configured to releasably engage with the dock receptacle tray 524a to secure the dock receptacle tray 524a to the packaging 500, for example to the base 504.

Utilizing the packaging 500 with the dock assembly 200 and/or the DDS 300 may have similarities to using the packaging 100 as described above. However, some differences exist between the disclosed packaging concepts. Unlike the packaging 100, in which various components of the dock assembly 200 and/or the DDS 300 are secured within a plurality of receptacles 124, the packaging 500 is configured to secure the various components via engagement with a plurality of retention features 518.

In some aspects, the packaging 500 may be manufactured such that the base 504 and/or the lids 508a, 508b need to be modified prior to introducing the dock assembly 200 or the DDS 300 thereto. The packaging 500 may be formed as a flat sheet including the base 504 and the lids 508a, 508b (see FIG. 28). The retention features 518 may be defined on the packaging 508 as cutouts in the base 504 and/or the lids 508a, 508b. The cutouts may be made by any suitable mechanism, such as a blade, rotary tool, laser, or another device. Prior to receiving components thereon, the retention features 518 may need to be deformed from a flat configuration (as they are manufactured) into a receiving configuration (in which the retention features 518 are configured to contact and secure components to the packaging 500). To move the retention features 518 from the flat configuration to the receiving configuration, each retention features 518, that will be used, on the base 504 can be deflected away from the base surface 512. Similarly, any retention features 518 intended to be used on the lids 508a and/or 508b can be deflected away from the lids 508a and/or 508b.

After the desired components of the dock assembly 200 and/or the DDS 300 are secured to the base 504, the lid or lids 508a, 508b can be deflected and hingedly moved along their respective hinges 509 towards the base 504 to cover at least a portion of the base 504 and the components thereon. In some aspects, the lids 508a, 508b may be secured to the base via attachment members 510 on the lids 508a, 508b that are configured to releasably engage with receiving members 511 on the base 504 or on another component of the packaging 500 (e.g. the dock holder 550). During the packaging process, standard inspections may be performed to ensure the quality and safety of all components being used. Various components of the DDS 300 and/or the dock assembly 200 can then be secured to the base 504 via the plurality of retention members (see exemplary layout of orientation members and possible components to be retained in FIGS. 28 and 29A-29I). After the desired components have been introduced and properly secured within the packaging 500, the packaging 500 may be subjected to sterilization practices as described above. The packaging 500 may be further introduced into one or more other containers for sterility and protection, such as the sleeve 101a, the first box 101b, the second box 101c, or another suitable container.

While systems and methods have been described in connection with the various examples of the various figures, it will be appreciated by those skilled in the art that changes could be made to the examples without departing from the broad inventive concept thereof. It is understood, therefore, that this disclosure is not limited to the particular examples disclosed, and it is intended to cover modifications within the spirit and scope of the present disclosure as defined by the claims.

Features of the disclosure that are described above in the context of separate examples may be provided in combination in a single example. Conversely, various features of the disclosure that are described in the context of a single example may also be provided separately or in any subcombination. Finally, while an example may be described as part of a series of steps or part of a more general structure, each said step may also be considered an independent example in itself, combinable with others.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Throughout this specification, words are to be afforded their normal meaning as would be understood by those skilled in the relevant art. However, so as to avoid misunderstanding, the meanings of certain terms has been specifically defined or clarified.

Additional Examples of the Disclosed Technology

In view of the above described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

Example 1. A container configured to receive a dock assembly therein for packaging, the container includes: a base defining an engagement surface configured to receive the dock assembly thereon; a lid configured to releasably engage with the base such that at least a portion of the dock assembly is disposed between the base and the lid; and a dock holder affixed to the container and configured to receive a portion of the dock assembly thereon, the container is configured to be sterilized.

Example 2. The container of any example herein, particularly example 1, further being configured to receive a dock delivery system (DDS) therein.

Example 3. The container of any example herein, particularly example 2, further includes a plurality of receptacles defined between the base and the lid, each of the plurality of receptacles being configured to receive at least a portion of the dock assembly and/or the DDS.

Example 4. The container of any example herein, particularly example 2 or 3, further includes a dock receptacle that includes the dock holder therein, the dock receptacle being configured to receive a liquid therein.

Example 5. The container of any example herein, particularly example 4, the liquid is at least heparinized saline.

Example 6. The container of any example herein, particularly any one of examples 1 to 5, the dock holder is cylindrical and defines an exterior surface configured to contact the dock assembly.

Example 7. The container of any example herein, particularly example 6, the exterior surface defines a protrusion extending from the exterior surface in a radial direction, the protrusion being configured to receive the dock assembly thereon.

Example 8. The container of any example herein, particularly example 7, the protrusion is a helical thread having a length and extending in a spiral path from a starting point on the exterior surface to an ending point on the exterior surface spaced axially from the starting point, the length being defined between the starting point and the ending point.

Example 9. The container of any example herein, particularly example 7, the thread is a discontinuous thread and defines at least one discontinuity between the starting point and the ending point.

Example 10. The container of any example herein, particularly example 9, the thread defines a plurality of discontinuities along the length.

Example 11. The container of any example herein, particularly example 10, at least some of the plurality of discontinuities overlap along the axial direction.

Example 12. The container of any example herein, particularly example 11, all of the plurality of discontinuities overlap along the axial direction.

Example 13. The container of any example herein, particularly any one of examples 1 to 12, further includes a post defined on the base and configured to receive the dock holder thereon to secure the dock holder to the base.

Example 14. The container of any example herein, particularly example 13, the dock holder defines a bore extending therethrough having a first cross-sectional shape, the post has a second cross-sectional shape, and the dock holder is configured to receive the post into the bore when the post is oriented relative to the dock holder in a desired alignment position, such that the first cross-sectional shape is complementary to the second cross-sectional shape and the post is insertable into the bore, and the post is not insertable into the bore if the post is not in the desired alignment position relative to the dock holder.

Example 15. The container of any example herein, particularly any one of examples 1 to 14, the dock holder defines an opening extending therethrough, the opening being adjacent to the dock assembly when the dock assembly is received onto the dock holder.

Example 16. The container of any example herein, particularly example 15, the dock holder defines a plurality of openings spaced apart from each other.

Example 17. The container of any example herein, particularly any one of examples 1 to 16, further includes polyethylene terephthalate glycol (PETG).

Example 18. The container of any example herein, particularly any one of examples 1 to 17, the lid is hingedly affixed to the base and configured to move towards and away from the base.

Example 19. The container of any example herein, particularly any one of examples 1 to 17, the lid is separate from the base and configured to releasably contact the base.

Example 20. The container of any example herein, particularly any one of examples 1 to 17, the base includes one or more retention members configured to contact the dock assembly to releasably secure the dock assembly to the base.

Example 21. The container of any example herein, particularly any one of examples 1 to 20, the container includes a plurality of dock holders, each dock holder being configured to contact the dock assembly.

Example 22. The container of any example herein, particularly any one of examples 1 to 21, further includes a sleeve configured to receive the container therein.

Example 23. A dock holder configured to releasably secure a dock assembly to a container, the dock holder includes: a body having a proximal end and a distal end opposite the proximal end and defining a central axis extending between the proximal and distal ends; and an exterior surface defined on the body and configured to receive the dock assembly thereon.

Example 24. The dock holder of any example herein, particularly example 23, the exterior surface defines a protrusion extending from the exterior surface in a radial direction, the protrusion being configured to receive the dock assembly thereon.

Example 25. The dock holder of any example herein, particularly example 24, the protrusion is a helical thread having a length and extending in a spiral path from a starting point on the exterior surface to an ending point on the exterior surface spaced axially from the starting point, the length being defined between the starting point and the ending point.

Example 26. The dock holder of any example herein, particularly example 25, the thread is a discontinuous thread and defines at least one discontinuity between the starting point and the ending point.

Example 27. The dock holder of any example herein, particularly example 26, the thread defines a plurality of discontinuities along the length.

Example 28. The dock holder of any example herein, particularly example 27, at least some of the plurality of discontinuities overlap along the axial direction.

Example 29. The dock holder of any example herein, particularly example 28, all of the plurality of discontinuities overlap along the axial direction.

Example 30. The dock holder of any example herein, particularly example 29, the body is cylindrical.

Example 31. The dock holder of any example herein, particularly any one of examples 23 to 30, the body further includes an interior surface spaced from the exterior surface in a radial direction towards the central axis, the interior surface defining a bore extending through the body.

Example 32. The dock holder of any example herein, particularly example 31, the bore is a through bore and extends from the proximal end to the distal end of the body.

Example 33. The dock holder of any example herein, particularly example 31 or 32, the bore has a first cross-sectional shape configured to complement a second cross-sectional shape of a post on the container, the dock holder is configured to be received onto the post when the dock holder is oriented relative to the post in a desired alignment position, such that the first cross-sectional shape is corresponds to the second cross-sectional shape and the post can be inserted into the bore of the dock holder, and the dock holder is not receivable on the post if the dock holder is not in the desired alignment position relative to the post.

Example 34. The dock holder of any example herein, particularly any one of examples 23 to 33, the dock holder defines an opening extending therethrough, the opening being adjacent to the dock assembly when the dock assembly is received onto the dock holder.

Example 35. The dock holder of any example herein, particularly example 34, the dock holder defines a plurality of openings spaced apart from each other.

Example 36. The dock holder of any example herein, particularly any one of examples 24 to 35, when the dock assembly is introduced onto the dock holder, the protrusion is disposed between at least two adjacent portions of the dock assembly along the axial direction.

Example 37. The dock holder of any example herein, particularly any one of examples 25 to 36, the thread has a pitch of between 0.02 inch and 1.0 inch (0.05 cm and 2.54 cm).

Example 38. The dock holder of any example herein, particularly any one of examples 25 to 37, the thread has a thread depth of between 0.01 inch to 1.5 inch (0.03 cm to 3.81 cm).

Example 39. The dock holder of any example herein, particularly any one of examples 25 to 38, the thread has a thread angle of between 0 and 60 degrees.

Example 40. The dock holder of any example herein, particularly any one of examples 23 to 39, further includes high-density polyethylene.

Example 41. A method of assembling a kit including a dock assembly, a dock delivery system (DDS), and a container according to any example herein, particularly any one of examples 1 to 22, the method c includes: disposing the dock assembly and/or the DDS within the container; releasably securing the dock assembly and/or the DDS to the container; and supporting the dock assembly on a dock holder according to any of examples 23 to 40, the dock assembly is at least partly wrapped around the dock holder.

Example 42. A method of preparing a dock assembly for introduction into a patient, the method includes: receiving a sterilized dock assembly within an enclosed container, according to any example herein, particularly any one of examples 1 to 22, into a sterile environment; opening the container; using a first liquid to displace air from inside the dock assembly; and using a second liquid to displace air from outside the dock assembly.

Example 43. The method of any example herein, particularly example 42, further includes preparing a dock delivery system (DDS) received in the container with the dock assembly, further includes using the first liquid to displace air from inside the DDS, using the first liquid to displace air from inside the dock assembly includes introducing the first liquid into the dock assembly through the DDS.

Example 44. The method of any example herein, particularly example 42 or 43, using the second liquid to displace air from outside the dock assembly includes applying the second liquid to the dock assembly.

Example 45. The method of any example herein, particularly example 44, applying the second liquid includes spraying the second liquid onto the dock assembly.

Example 46. The method of any example herein, particularly example 44, applying the second liquid includes submerging the dock assembly into the second liquid within a receptacle containing the dock assembly and configured to receive and hold the second liquid.

Example 47. The method of any example herein, particularly any one of examples 43 to 46, the first liquid and the second liquid are the same liquid.

Example 48. The method of any example herein, particularly any one of examples 42 to 47, the first liquid and the second liquid include saline.

Example 49. A dock receptacle tray for use with a container having a dock assembly therein, the dock receptacle tray being configured to receive a dock assembly and a liquid therein.

Example 50. The dock receptacle tray of any example herein, particularly example 49, the dock receptacle tray is configured to be releasably engaged with a container according to any one of examples 1 to 22.

Example 51. A container configured to receive a dock assembly therein for packaging, the container comprising: a base defining an engagement surface configured to receive the dock assembly; a lid configured to releasably engage with the base such that at least a portion of the dock assembly is disposed between the base and the lid; and a dock holder affixed to the container and configured to receive a first portion of the dock assembly comprising two or more adjacent coils thereon, the dock holder comprising a protrusion configured to engage the first portion of the dock assembly and space a second portion of the dock assembly away from the dock holder.

Example 52. The container of any example herein, particularly example 51, wherein the dock holder is cylindrical and defines an exterior surface configured to contact the first portion of the dock assembly, wherein the protrusion extends outward from the exterior surface in a radial direction, and wherein the protrusion is configured to separate the two or more adjacent coils of the first portion of the dock assembly from one another.

Example 53. The container of any example herein, particularly example 52, wherein the protrusion is a helical thread having a length and extending in a spiral path from a starting point on the exterior surface of the dock holder to an ending point on the exterior surface, the ending point spaced axially away from the starting point, the length being defined between the starting point and the ending point.

Example 54. The container of any example herein, particularly example 53, wherein the helical thread is a discontinuous thread and defines at least one discontinuity between the starting point and the ending point.

Example 55. The container of any example herein, particularly any one of examples 51 to 54, further comprising a post defined on the base and configured to receive the dock holder thereon to secure the dock holder to the base.

Example 56. The container of any example herein, particularly example 55, wherein the dock holder defines a bore extending therethrough having a first cross-sectional shape, wherein the post has a second cross-sectional shape, wherein the dock holder is configured to receive the post inside the bore when the post is oriented relative to the dock holder in a desired alignment position such that the first cross-sectional shape is complementary to the second cross-sectional shape and the post is insertable into the bore, and wherein the post is not insertable into the bore if the post is not in the desired alignment position relative to the dock holder.

Example 57. The container of any example herein, particularly any one of examples 51 to 56, wherein the dock holder defines an opening extending therethrough in a radial direction, the opening being adjacent to the first portion of the dock assembly when the first portion of the dock assembly is received onto the dock holder.

Example 58. The container of any example herein, particularly any one of examples 51 to 57, further comprising a plurality of receptacles defined between the base and the lid, the plurality of receptacles including a first receptacle including the dock holder disposed therein and configured to receive a liquid therein.

Example 59. The container of any example herein, particularly example 58, wherein the plurality of receptacles further includes one or more receptacles configured to receive one or more portions of a dock delivery system (DDS), the DDS coupled to the dock assembly.

Example 60. The container of any example herein, particularly example 59, wherein the base includes one or more retention members configured to contact a portion of the DDS to releasably secure the portion of the DDS to the base.

Example 61. The container of any example herein, particularly any one of examples 51 to 60, wherein the lid is hingedly affixed to the base and configured to move towards and away from the base.

Example 62. A dock holder configured to releasably secure a dock assembly to a container, the dock holder comprising: a body having a proximal end, a distal end opposite the proximal end, and an inner surface defining a central bore extending between the proximal and distal ends; and a helical thread extending around and radially outward from an exterior surface of the body, the helical thread configured to receive a first portion of the dock assembly thereon.

Example 63. The dock holder of any example herein, particularly example 62, wherein the helical thread is configured to separate adjacent coils of the first portion of the dock assembly from each other along a length of the body of the dock holder.

Example 64. The dock holder of any example herein, particularly example 62 or example 63, wherein the helical thread comprises two or more discontinuous threads that are spaced apart from one another in an axial direction that extends between the proximal and distal ends of the body of the dock holder, and wherein the two or more discontinuous threads are configured to separate adjacent coils of the first portion of the dock assembly from each other.

Example 65. The dock holder of any example herein, particularly example 64, wherein each thread of the two or more discontinuous threads has a thread lead and thread end that are spaced apart from one another in a circumferential direction to create a break in the thread, and wherein breaks of the two or more discontinuous threads are aligned in the axial direction such that a space without threads is formed along the exterior surface of the body, between the proximal end and the distal end.

Example 66. The dock holder of any example herein, particularly example 64 or example 65, wherein the dock holder defines an opening extending through the body, in a radial direction between the exterior surface and the inner surface, the opening disposed between adjacent threads of the two or more discontinuous threads.

Example 67. An assembly comprising: a container comprising a base including a first depression with a post extending outward from the depression; and a dock holder disposed within the first depression and mounted around the post, the dock holder configured to receive a first portion of a dock assembly around an exterior surface of the dock holder and comprising a radial protrusion configured to separate adjacent coils of the first portion of the dock assembly from each other.

Example 68. The assembly of any example herein, particularly example 67, wherein the base includes a second depression configured to receive a portion of a dock delivery system coupled to the dock assembly, and wherein the first depression is configured to receive a liquid.

Example 69. The assembly of any example herein, particularly example 67 or example 68, wherein the radial protrusion is a helical thread including a thread lead disposed adjacent a distal end of the dock holder, and wherein the thread lead is configured to space a second portion of the dock assembly away from the dock holder, the second portion having a larger diameter that the first portion of the dock assembly.

Example 70. The assembly of any example herein, particularly any one of examples 67 to 69, wherein the dock holder has an inner surface comprising one or more projections extending radially from the interior surface towards a central axis of the dock holder and defining a central bore with a first cross-sectional shape, and wherein the post has a second cross-sectional shape that is complementary to the first cross-sectional shape of the central bore.

The features described herein with regard to any example can be combined with other features described in any one or more of the other examples, unless otherwise stated. For example, any one or more of the features of one container or packaging or dock holder can be combined with any one or more features of another container or packaging or dock holder.

In view of the many possible examples to which the principles of the disclosed technology may be applied, it should be recognized that the illustrated examples are only preferred examples of the disclosed technology and should not be taken as limiting the scope of the claimed subject matter. Rather, the scope of the claimed subject matter is defined by the following claims and their equivalents.

What is claimed:

1. A container configured to receive a dock assembly therein for packaging, the container comprising:
    a base defining an engagement surface configured to receive the dock assembly;
    a lid configured to releasably engage with the base such that at least a portion of the dock assembly is disposed between the base and the lid; and
    a dock holder affixed to the container and configured to receive a first portion of the dock assembly comprising two or more adjacent coils thereon, the dock holder comprising a protrusion configured to engage the first portion of the dock assembly and space a second portion of the dock assembly away from the dock holder, wherein the dock holder is cylindrical and defines an exterior surface configured to contact the first portion of the dock assembly, wherein the protrusion extends outward from the exterior surface in a radial direction, and wherein the protrusion is configured to separate the two or more adjacent coils of the first portion of the dock assembly from one another.

2. The container of claim 1, wherein the protrusion is a helical thread having a length and extending in a spiral path from a starting point on the exterior surface of the dock holder to an ending point on the exterior surface, the ending point spaced axially away from the starting point, the length being defined between the starting point and the ending point.

3. The container of claim 2, wherein the helical thread is a discontinuous thread and defines at least one discontinuity between the starting point and the ending point.

4. The container of claim 1, further comprising a post defined on the base and configured to receive the dock holder thereon to secure the dock holder to the base.

5. The container of claim 4, wherein the dock holder defines a bore extending therethrough having a first cross-sectional shape, wherein the post has a second cross-sectional shape, wherein the dock holder is configured to receive the post inside the bore when the post is oriented relative to the dock holder in a desired alignment position such that the first cross-sectional shape is complementary to the second cross-sectional shape and the post is insertable into the bore, and wherein the post is not insertable into the bore if the post is not in the desired alignment position relative to the dock holder.

6. The container of claim 1, wherein the dock holder defines an opening extending therethrough in a radial direction, the opening being adjacent to the first portion of the dock assembly when the first portion of the dock assembly is received onto the dock holder.

7. The container of claim 1, further comprising a plurality of receptacles defined between the base and the lid, the plurality of receptacles including a first receptacle including the dock holder disposed therein and configured to receive a liquid therein.

8. The container of claim 7, wherein the plurality of receptacles further includes one or more receptacles configured to receive one or more portions of a dock delivery system (DDS), the DDS coupled to the dock assembly.

9. The container of claim 8, wherein the base includes one or more retention members configured to contact a portion of the DDS to releasably secure the portion of the DDS to the base.

10. The container of claim 1, wherein the lid is hingedly affixed to the base and configured to move towards and away from the base.

11. An assembly comprising:
a container comprising a base including a first depression with a post extending outward from the depression; and
a dock holder disposed within the first depression and mounted around the post, the dock holder configured to receive a first portion of a dock assembly around an exterior surface of the dock holder and comprising a radial protrusion configured to separate adjacent coils of the first portion of the dock assembly from each other, wherein the radial protrusion is a helical thread.

12. The assembly of claim 11, wherein the base includes a second depression configured to receive a portion of a dock delivery system coupled to the dock assembly, and wherein the first depression is configured to receive a liquid.

13. The assembly of claim 11, wherein the helical thread includes a thread lead disposed adjacent a distal end of the dock holder, and wherein the thread lead is configured to space a second portion of the dock assembly away from the dock holder, the second portion having a larger diameter that the first portion of the dock assembly.

14. The assembly of claim 11, wherein the dock holder has an inner surface comprising one or more projections extending radially from the interior surface towards a central axis of the dock holder and defining a central bore with a first cross-sectional shape, and wherein the post has a second cross-sectional shape that is complementary to the first cross-sectional shape of the central bore.

15. An assembly comprising:
a dock assembly having at least a portion with a helical shape and comprising a plurality of coils;
a dock holder configured to receive a first portion of the dock assembly around an exterior surface of the dock holder and comprising a radial protrusion configured to separate adjacent coils of the first portion of the dock assembly from each other; and
a container comprising a base including a first depression with a post extending outward from the depression, wherein the dock holder is disposed within the first depression and mounted around the post.

16. The assembly of claim 15, wherein the dock holder is cylindrical and defines the exterior surface of the dock holder, and wherein the radial protrusion extends outward in a radial direction from the exterior surface.

17. The assembly of claim 15, wherein the radial protrusion is a helical thread.

18. The assembly of claim 17, wherein the helical thread is configured to separate adjacent coils of the first portion of the dock assembly from each other along a length of the dock holder.

19. The assembly of claim 18, wherein a thread lead of the helical thread is disposed adjacent a distal end of the dock holder, and wherein the thread lead is configured to space a second portion of the dock assembly away from the dock holder.

* * * * *